US008543591B2

(12) United States Patent
Nandy et al.

(10) Patent No.: US 8,543,591 B2
(45) Date of Patent: Sep. 24, 2013

(54) METHOD AND SYSTEM FOR GENERATING AND SHARING DATASET SEGMENTATION SCHEMES

(75) Inventors: Sagnik Nandy, Los Gatos, CA (US); Lik Mui, Hayward, CA (US); Brian Jonathan Patton, San Francisco, CA (US); Matthew Reardon Jones, New York, NY (US); Hui Sok Moon, Campbell, CA (US); Theodore Nicholas Choc, Sunnyvale, CA (US); Wayne Douglas Vandermolen, San Jose, CA (US); Nicholas John Seckar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 12/575,437

(22) Filed: Oct. 7, 2009

(65) Prior Publication Data
US 2011/0055250 A1 Mar. 3, 2011

Related U.S. Application Data

(60) Provisional application No. 61/239,388, filed on Sep. 2, 2009.

(51) Int. Cl.
*G06F 7/00* (2006.01)
*G06F 17/30* (2006.01)

(52) U.S. Cl.
USPC ............................................................ 707/769

(58) Field of Classification Search
USPC .................................. 707/769, 101; 725/112
See application file for complete search history.

(56) References Cited

U.S. PATENT DOCUMENTS

| 5,870,746 A * | 2/1999 | Knutson et al. ........................ 1/1 |
| 6,317,787 B1 | 11/2001 | Boyd et al. |
| 6,392,668 B1 | 5/2002 | Murray |
| 6,581,054 B1 | 6/2003 | Bogrett |

(Continued)

FOREIGN PATENT DOCUMENTS

| KR | 10-0695467 B1 | 3/2007 |
| WO | WO 02/27528 A1 | 4/2002 |
| WO | WO 2006/133218 A2 | 12/2006 |
| WO | WO 2006/133219 A2 | 12/2006 |

OTHER PUBLICATIONS

International Search Report and Written Opinion for PCTTUS2010/053417 dated May 30, 2011, 8 pgs.

(Continued)

*Primary Examiner* — Jacob F Bétit
*Assistant Examiner* — Christy Lin
(74) *Attorney, Agent, or Firm* — Foley and Lardner LLP; John D. Lanza

(57) ABSTRACT

A computer-implemented method for generating and sharing dataset segment schemes of a multidimensional dataset at a client device is disclosed. The client device displays a first filter definition template and an attribute list. Upon detecting a user selection of a first attribute, the client device displays the first attribute and one or more candidate filter conditions in the first filter definition template. Upon detecting a user selection of a first filter condition in the first filter definition template, the client device submits a segment scheme generation request to the server system and receives from the server system a first segment identifier; and displays a first segment link at the client device, the first segment link including the first segment identifier.

21 Claims, 24 Drawing Sheets

(56) References Cited

U.S. PATENT DOCUMENTS

| | | |
|---|---|---|
| 6,604,095 B1 | 8/2003 | Cesare et al. |
| 6,850,933 B2 | 2/2005 | Larson et al. |
| 6,925,442 B1 | 8/2005 | Shapira et al. |
| 6,975,963 B2 | 12/2005 | Hamilton et al. |
| 7,085,682 B1 | 8/2006 | Heller et al. |
| 7,310,590 B1 | 12/2007 | Bansal |
| 7,464,122 B1 | 12/2008 | Basko et al. |
| 7,523,191 B1 | 4/2009 | Thomas et al. |
| 7,627,572 B2 | 12/2009 | Bohannon |
| 7,669,212 B2 | 2/2010 | Alao et al. |
| 7,673,340 B1 | 3/2010 | Cohen et al. |
| 7,716,011 B2 | 5/2010 | Thibaux et al. |
| 7,895,012 B2 | 2/2011 | Turicchi, Jr. |
| 2003/0158795 A1 | 8/2003 | Markham et al. |
| 2004/0054784 A1 | 3/2004 | Busch et al. |
| 2005/0114206 A1 | 5/2005 | Bennett et al. |
| 2006/0074905 A1 | 4/2006 | Yun et al. ............ 707/5 |
| 2006/0074910 A1 | 4/2006 | Yun et al. ............ 707/7 |
| 2006/0085741 A1 | 4/2006 | Weiner et al. |
| 2006/0184508 A1 | 8/2006 | Fuselier et al. |
| 2006/0189330 A1 | 8/2006 | Nelson et al. |
| 2006/0277197 A1 | 12/2006 | Bailey |
| 2006/0277585 A1* | 12/2006 | Error et al. ............ 725/112 |
| 2007/0112607 A1 | 5/2007 | Tien et al. |
| 2007/0185826 A1 | 8/2007 | Brice et al. |
| 2008/0140524 A1 | 6/2008 | Anand et al. |
| 2008/0184116 A1 | 7/2008 | Error |
| 2008/0208910 A1 | 8/2008 | MacIntyre et al. |
| 2008/0275980 A1 | 11/2008 | Hansen ............ 709/224 |
| 2009/0063549 A1 | 3/2009 | Bhatia et al. |
| 2009/0198724 A1 | 8/2009 | Valimaki et al. |
| 2010/0030544 A1 | 2/2010 | Gopalan et al. |
| 2010/0205029 A1 | 8/2010 | Asherman et al. |
| 2010/0287146 A1 | 11/2010 | Skelton et al. |
| 2011/0035272 A1 | 2/2011 | Bhatt et al. |

OTHER PUBLICATIONS

International Search Report and Written Opinion for International Application No. PCT/US2010/047341, mailed Dec. 16, 2010, 9 pages.

\* cited by examiner

Raw Data 470

| Session ID | PageViews | Browser | Country | Avg. Time on Site | ... |
|---|---|---|---|---|---|
| 1 | 4 | Firefox | US | 00:01:02 | ... |
| 2 | 15 | IE | Canada | 00:07:34 | ... |
| 3 | 8 | Firefox | US | 00:00:58 | ... |
| 4 | 2 | IE | US | 00:02:15 | ... |
| 5 | 7 | Firefox | UK | 00:01:41 | ... |
| 6 | 9 | Chrome | Mexico | 00:00:47 | ... |

Filter Definitions 472

| Filter A | Country | Matches Exactly | "US" |
|---|---|---|---|
| Filter B | Pageviews | Greater Than | 6 |
| Filter C | Browser | Matches Exactly | "Firefox" |

Result for Filter A 474-A

| 1 | 4 | Firefox | US | 00:01:02 | ... |
|---|---|---|---|---|---|
| 3 | 8 | Firefox | US | 00:00:58 | ... |
| 4 | 2 | IE | US | 00:02:15 | ... |

Result for Filter B 474-B

| 2 | 15 | IE | Canada | 00:07:34 | ... |
|---|---|---|---|---|---|
| 3 | 8 | Firefox | US | 00:00:58 | ... |
| 5 | 7 | Firefox | UK | 00:01:41 | ... |
| 6 | 9 | Chrome | Mexico | 00:00:47 | ... |

Result for Filter C 474-C

| 1 | 4 | Firefox | US | 00:01:02 | ... |
|---|---|---|---|---|---|
| 3 | 8 | Firefox | US | 00:00:58 | ... |
| 5 | 7 | Firefox | UK | 00:01:41 | ... |

Segment Result 476

| 3 | 8 | Firefox | US | 00:00:58 | ... |
|---|---|---|---|---|---|

Manage Advanced Segments Beta

Segments let you group certain types of visits together.

Advanced Segments in www.googlestore.com

+ Create new custom segment

| Name | Conditions | | Action |
|---|---|---|---|
| First Segment | Pageviews Greater than 5 ... | HIDE FROM PROFILE | Edit | Copy | Share | Delete |
| Second | Product Matches exactly GO14022M ... | HIDE FROM PROFILE | Edit | Copy | Share | Delete |
| Palo Alto Conversion | Transactions Greater than 0 ... | | |
| test | Country/Territory Matches exactly United States ... | HIDE FROM PROFILE | Edit | Copy | Share | Delete |

Share Link:
http://www.google.com/analytics/reporting/e

926

1 - 4 of 4

Search: [    ] Go

▼ Default Segments

- Dashboard
- Visitors
- Traffic Sources
- Content
- Goals
- ▼ Ecommerce
- Custom Reporting Beta

My Customizations
- Custom Reports Beta
- Advanced Segments Beta
- Email

Help Resources
- About this Report
- Common Questions

Out of a total of ? visits...

Country/Territory — 1033
Condition: Matches exactly ▼
Value:

or

Pageviews — 1035
Condition: Greater than ▼
Value: 0 or

Add "or" statement and

Add "and" statement

...this segment matches? visits

Test Segment

Dimensions
- Visit Duration
- Visitor Type
- Count of Visits
- City
- Language
- Region
- Country/Territory
- Continent
- Sub Continent Region
- User Defined Value type to filter
☐ list view

Metrics
- New Visits
- Time on Page
- Pageviews

Test Segment

Create Segment

Name segment: _____

Visible in: www.googlestore.com

180
METHOD AND SYSTEM FOR GENERATING AND SHARING DATASET SEGMENTATION SCHEMES

RELATED APPLICATIONS

This application claims priority to U.S. Provisional Patent Application No. 61/239,388, filed Sep. 2, 2009, entitled "Method And System For Segmenting A Multidimensional Dataset, Generating And Sharing Dataset Segment Schemes," the content of which is incorporated by reference herein in its entirety.

This application is related to U.S. Provisional Patent Application No. 61/181,275, filed May 26, 2009, entitled "System and Method for Aggregating Analytics Data", the content of which is incorporated by reference herein in its entirety.

This application is related to U.S. Provisional Patent Application No. 61/181,276, filed May 26, 2009, entitled "Dynamically Generating Aggregate Tables", the content of which is incorporated by reference herein in its entirety.

This application is related to U.S. Provisional Patent Application No. 61/239,372, filed Sep. 2, 2009, entitled "Method and System for Pivoting a Multidimensional Dataset", the content of which is incorporated by reference herein in its entirety.

TECHNICAL FIELD

The disclosed embodiments relate generally to the visualization of multidimensional database, and in particular, to a system and method for generating and sharing dataset segment schemes between different users.

BACKGROUND

Web analytics is the measurement, collection, analysis and reporting of the traffic data of a web site for purposes of understanding and optimizing the web site usage. The traffic data is typically organized in the form of a multidimensional dataset whose metadata may include multiple dimensions and metric attributes (also known as "measures"). One method of performing web analytics is to visualize different subsets of the multidimensional dataset defined by various configurations of dimensions and metric attributes. From examining the visualized traffic data, an information analyst may be able to discover information valuable for improving the quality and volume of the traffic to a web site. But the exercise of searching information within the multidimensional dataset is non-trivial if the volume of the traffic data is significant or the metadata includes a large number of dimensions and metric attributes.

SUMMARY

In accordance with some embodiments described below, a computer-implemented method for generating and sharing dataset segment schemes of a multidimensional dataset at a client device is disclosed. The client device is connected to a server system through a network and the dataset is characterized by a set of dimension attributes and a set of metric attributes. The method includes displaying a first filter definition template and an attribute list including at least one dimension attribute and at least one metric attribute; receiving a user selection of a first attribute in the attribute list to define a first data filter in the first filter definition template; displaying the first attribute and one or more candidate filter conditions in the first filter definition template; receiving a user selection of a first filter condition among the one or more candidate filter conditions in the first filter definition template; submitting a segment scheme generation request to the server system, wherein the segment scheme generation request includes a first data filter including the first attribute and the first filter criterion; receiving from the server system a first segment identifier that identifies a dataset segment scheme generated by the server system in response to the segment scheme generation request; and displaying a first segment link at the client device, the first segment link including the first segment identifier.

In accordance with some embodiments described below, a client device for generating and sharing dataset segment schemes of a multidimensional dataset is disclosed. The client device is connected to the server system through a network, and the multidimensional dataset is characterized by a set of dimension attributes and a set of metric attributes and managed by the server system. The client device includes one or more processors for executing programs and memory to store data and to store one or more programs to be executed by the one or more processors. The one or more programs including instructions for: displaying a first filter definition template and an attribute list including at least one dimension attribute and at least one metric attribute; receiving a user selection of a first attribute in the attribute list to define a first data filter in the first filter definition template; displaying the first attribute and one or more candidate filter conditions in the first filter definition template; receiving a user selection of a first filter condition among the one or more candidate filter conditions in the first filter definition template; submitting a segment scheme generation request to the server system, wherein the segment scheme generation request includes a first data filter including the first attribute and the first filter criterion; receiving from the server system a first segment identifier that identifies a dataset segment scheme generated by the server system in response to the segment scheme generation request; and displaying a first segment link at the client device, the first segment link including the first segment identifier.

In accordance with some embodiments described below, a computer readable-storage medium storing one or more programs for execution by one or more processors of a client device for generating and sharing dataset segment schemes of a multidimensional dataset is disclosed. The client device is connected to the server system through a network, and the multidimensional dataset is characterized by a set of dimension attributes and a set of metric attributes and managed by the server system. The one or more programs include instructions for: displaying a first filter definition template and an attribute list including at least one dimension attribute and at least one metric attribute; receiving a user selection of a first attribute in the attribute list to define a first data filter in the first filter definition template; displaying the first attribute and one or more candidate filter conditions in the first filter definition template; receiving a user selection of a first filter condition among the one or more candidate filter conditions in the first filter definition template; submitting a segment scheme generation request to the server system, wherein the segment scheme generation request includes a first data filter including the first attribute and the first filter criterion; receiving from the server system a first segment identifier that identifies a dataset segment scheme generated by the server system in response to the segment scheme generation request; and displaying a first segment link at the client device, the first segment link including the first segment identifier.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIG. 4D is a block diagram of an example of aggregating data filtering results into a segment result in accordance with some embodiments.

FIG. 8C is a screenshot of a graphical user interface that includes a data filter in a filter definition template based on user instructions in accordance with some embodiments.

FIG. 9C is a screenshot of the graphical user interface after the first client device detects a user request to share one of the segment links in accordance with some embodiments.

FIG. 10C is a screenshot of a dataset segment scheme that includes two filter definition templates connected by a logic disjunctive operator in accordance with some embodiments.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
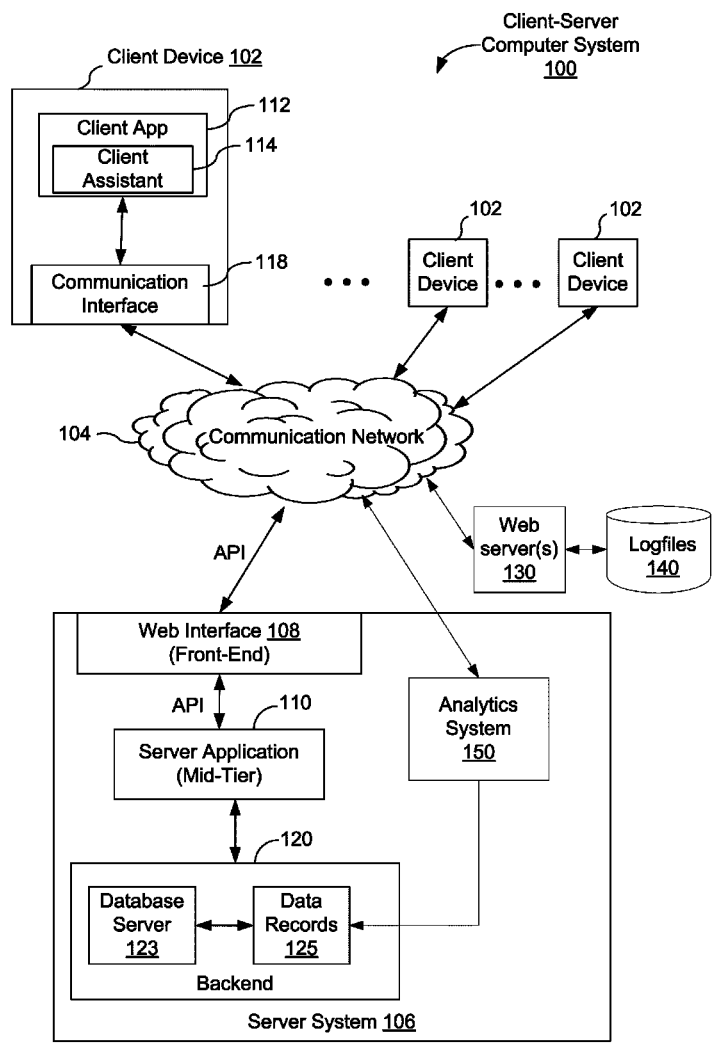
FIG. 1 is an overview block diagram of a client-server server system for visualizing multidimensional datasets in accordance with some embodiments.

FIG. 1 is an overview block diagram of a client-server server system 100 for visualizing multidimensional datasets in accordance with some embodiments. The client-server server system 100 includes a plurality of client devices 102 connected to a server system 106 through one or more communication networks 104.

A client device 102 (also known as a "client") may be any computer or similar device through which a user of the client device 102 can submit data access requests to and receive results or other services from the server system 106. Examples include, without limitation, desktop computers, laptop computers, tablet computers, mobile devices such as mobile phones, personal digital assistants, set-top boxes, or any combination of the above. A respective client 102 may contain at least one client application 112 for submitting requests to the server system 106. For example, the client application 112 can be a web browser or other type of application that permits a user to access the services provided by the server system 106.

In some embodiments, the client application 112 includes one or more client assistants 114. A client assistant 114 can be a software application that performs tasks related to assisting a user's activities with respect to the client application 112 and/or other applications. For example, the client assistant 114 may assist a user at the client device 102 with browsing information (e.g., web pages), processing information (e.g., query results) received from the server system 106, and monitoring the user's activities on the query results. In some embodiments, the client assistant 114 is embedded in a web page (e.g., a query results web page) or other documents downloaded from the server system 106. In some embodiments, the client assistant 114 is a part of the client application 112 (e.g., a plug-in application of a web browser). The client 102 further includes a communication interface 118 to support the communication between the client 102 and other devices (e.g., the server system 106 or another client device 102).

The communication network(s) 104 can be any wired or wireless local area network (LAN) and/or wide area network (WAN), such as an intranet, an extranet, the Internet, or a combination of such networks. In some embodiments, the communication network 104 uses the HyperText Transport Protocol (HTTP) and the Transmission Control Protocol/Internet Protocol (TCP/IP) to transport information between different networks. The HTTP permits client devices to access various information items available on the Internet via the communication network 104. The various embodiments of the invention, however, are not limited to the use of any particular protocol.

In some embodiments, the server system 106 includes a web interface 108 (also referred to as a "front-end server"), a server application 110 (also referred to as a "mid-tier server"), and a backend server 120. The web interface 108 receives data access requests from client devices 102 and forwards the requests to the server application 110. In response to receiving the requests, the server application 110 decides how to process the requests including identifying data filters associated with a request, checking whether it has data available for the request, submitting queries to the backend 120 for data requested by the client, processing the data returned by the backend 120 that matches the queries, and returning the processed data as results to the requesting clients 102. After receiving a result, the client application 112 at a particular client 102 displays the result to the user who submits the original request.

In some embodiments, the backend 120 is effectively a database management system including a database server 123 that is configured to manage a large number of data records 125 stored at the server system 106. In response to a query submitted by the server application 110, the database server 123 identifies zero or more data records that satisfy the query and return the data records to the server application 110 for further processing. More detailed descriptions of the operations within the backend 120 are provided below in connection with FIGS. 4A and 7B.

In some embodiments, the server system 106 is an application service provider (ASP) that provides web analytics services to its customers (e.g., a web site owner) by visualizing the traffic data generated at a web site in accordance with various user requests. To do so, the server system 106 may include an analytics system 150 adapted for processing the raw traffic data of a web server 130 such as the logfiles 140 and other types of traffic data generated by the web server 130 through techniques such as page tagging. The raw web traffic data is first processed into a multidimensional dataset that includes multiple dimensions and multiple metric attributes (or measures) before the server system 106 can answer any data visualization requests through the web interface 108. A more detailed description of the processing of raw web traffic data can be found in the U.S. Provisional Patent Application No. 61/181,275, filed May 26, 2009, entitled "System and Method for Aggregating Analytics Data" and the U.S. Provisional Patent Application No. 61/181,276, filed May 26, 2009, entitled "Dynamically Generating Aggregate Tables", the contents of which are incorporated by reference herein in their entirety. For simplicity, it is assumed herein that the data records managed by the backend 120 and accessible to the server application 110 are not the raw web traffic data, but the data after being pre-processed.

Figure 2:
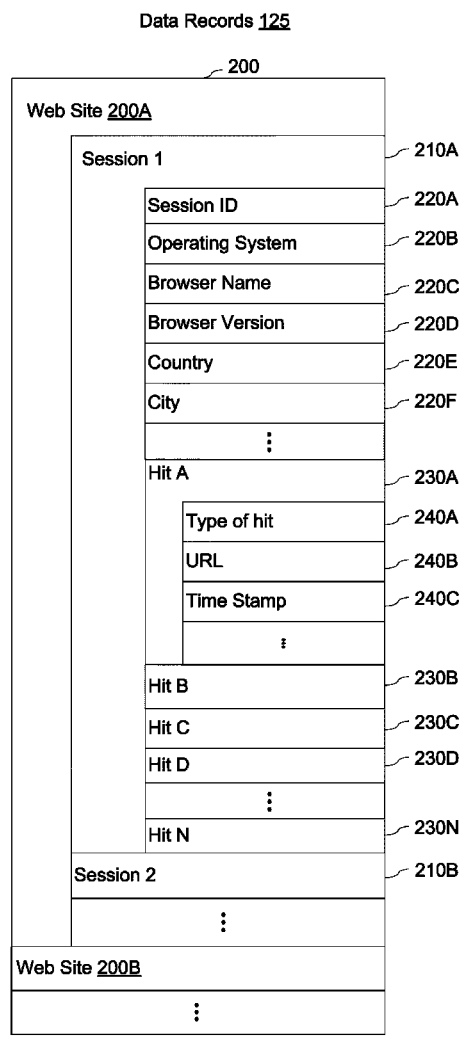
FIG. 2 is a block diagram of a data structure that stores traffic data at different web sites in accordance with some embodiments.

FIG. 2 is a block diagram of a data structure 200 used for storing the pre-processed web traffic data at different web sites in accordance with some embodiments. The web data stored in the data structure 200 have a hierarchical structure. The top level of the hierarchy corresponds to different web sites 200A, 200B (i.e., different web servers). For a respective web site, the traffic data is grouped into multiple sessions 210A, 210B, each session having a unique session ID 220. A session ID uniquely identifies a user's session with the web site 200A for the duration of that user's visit. Within a session 210A, other session-level attributes include operating system 220B (i.e., the operating system the computer runs on from which the user accesses the web site), browser name 220C (i.e., the web browser application used by the user for accessing the web site) and browser version 220D, geographical information of the computer such as the country 220E and the city 220F, etc.

For convenience and custom, the web traffic data of a user session (or a visit) is further divided into one or more hits 230A to 230N. Note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 230A may be characterized by attributes such as type of hit 240A (e.g., transaction hit, etc.), referral URL 240B (i.e., the web page the visitor was on when the hit was generated), a timestamp 240C that indicates when the hit occurs and so on. Note that the session-level and hit-level attributes as shown in FIG. 2 are listed for illustrative purposes only. As will be shown in the examples below, a session or a hit may have many other attributes that either exist in the raw traffic data (e.g., the timestamp) or can be derived from the raw traffic data by the analytics system 150 (e.g., the average pageviews per session).

Referring back to FIG. 1, a user at a client device 102 submits a request to the server system 106 for generating a report of the web traffic data associated with a particular web site. Upon receipt of the request, the server application 110 generates or identifies one or more queries and submits the queries to the backend server 120 that manages the web site's "sessionized" traffic data in the data structure 200 and processes the query results returned by the backend server 120 such that they can be visualized at the client device 102 in the form of a web analytics report.

Figure 3:
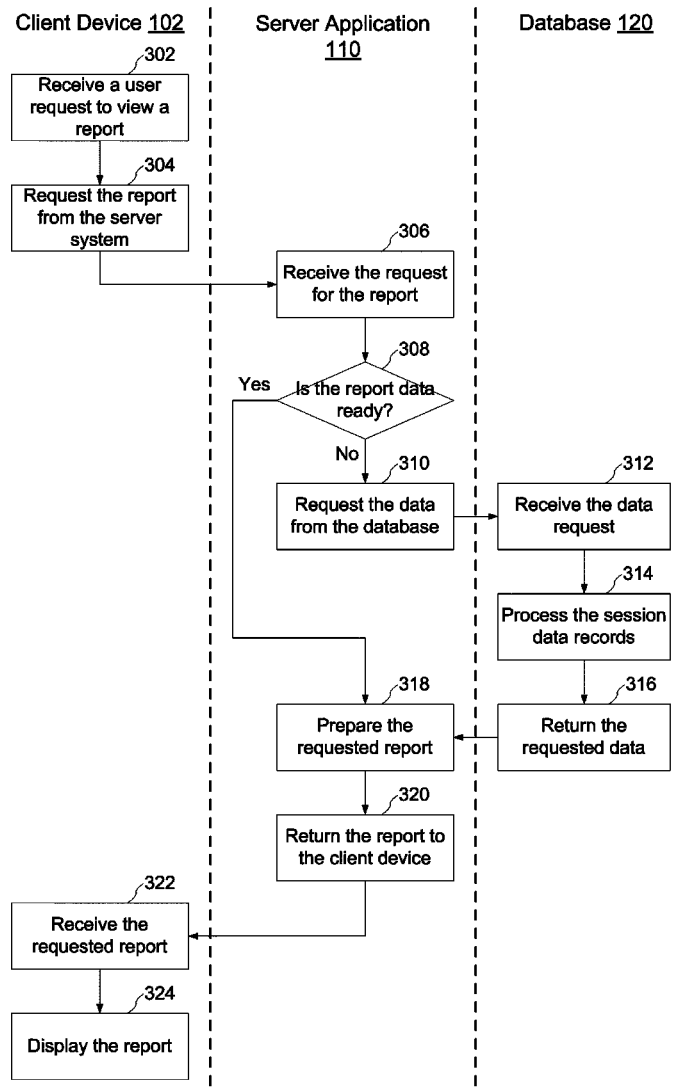
FIG. 3 is a flow chart of a process for generating a web analytics report in accordance with some embodiments.

FIG. 3 is an overview flow chart of a process for generating a web analytics report in accordance with some embodiments. The process begins with the client device 102 receiving a user-provided request to view a report of the web traffic data for a specific web site in a user-specified manner (302). In some embodiments, a user first logs into his or her account at the server system 106 through a web browser window. The web browser window may include one or more default analytics reports of the traffic data prepared by the server system 106 in accordance with pre-existing analytics report definitions stored at the server system 106 for the specific web site. As will be described below in detail, the user can customize the definition of an existing analytics report or define a new analytics report based on his or her specific needs. In response to a user selection of a particular web analytics report, the client device 102 submits a request for the report to the server system 106 (304).

Within the server system 106, the web interface 108 receives the request and forwards the request to the server application 110. In some embodiments, the client request is received in the form of one or more data packets defined by a communication protocol. The web interface 108 may perform predefined operations such as extracting information from the data packets and grouping the extracted information together into a format understood by the server application 110. Upon receipt of the client request for the analytics report (306), the server application 110 may check whether the client-requested traffic data for preparing the report is ready or not (308). In some embodiments, the current client request may follow an earlier client request and the two requests correspond to the same set of data records that have been generated or identified by the server application 110 in response to the earlier request. Thus, there is no need for the server application 110 to resubmit any new queries to the backend 120.

If the client-requested data is available (308, yes), the server application 110 then prepares the analytics report using the existing data (318) and returns the report to the requesting client device (320). In some embodiments, the server application 110 prepares the analytics report by identifying a client-requested portion of a set of data records in the analytics report that was generated in response to a previous request and customizing the client-requested portion in a format to be rendered at the client device 102.

If the report-requested data is not available (308, no), the server application 110 needs to generate or identify one or more queries (or data filters) and submit the queries for the data to the backend 120 (310). In some embodiments, the server application 110 converts the client request into one or more database queries or data filters, stores the queries in the server system 106, and applies them to the backend 120. Upon receipt of the data filters (312), the database 120 processes the session-based web traffic data records as shown in FIG. 2 (314) to identify those data records that satisfy the data filters. A more detailed description of this process is provided below in connection with FIGS. 4A and 7B. At the end of the process, the backend 120 returns the identified data records to the server application 110 for preparing the analytics report (316). Note that the reply from the backend 120 may be empty if no data is found that satisfies the data filters. Based on the reply from the backend 120, the server application 110 prepares the requested analytics report (318) and returns the report to the client device (320).

In either case, the client device 102 receives the requested analytics report (322) and displays the report to the user (324). Web traffic data can be visualized using different visualization tools including table, bar chart, pie chart, curve, map, pivot table, etc. Among these tools, pivot table is often a good choice because it provides an in-depth view of the flat data and helps a user to derive useful information from the web traffic data.

Figure 4A:
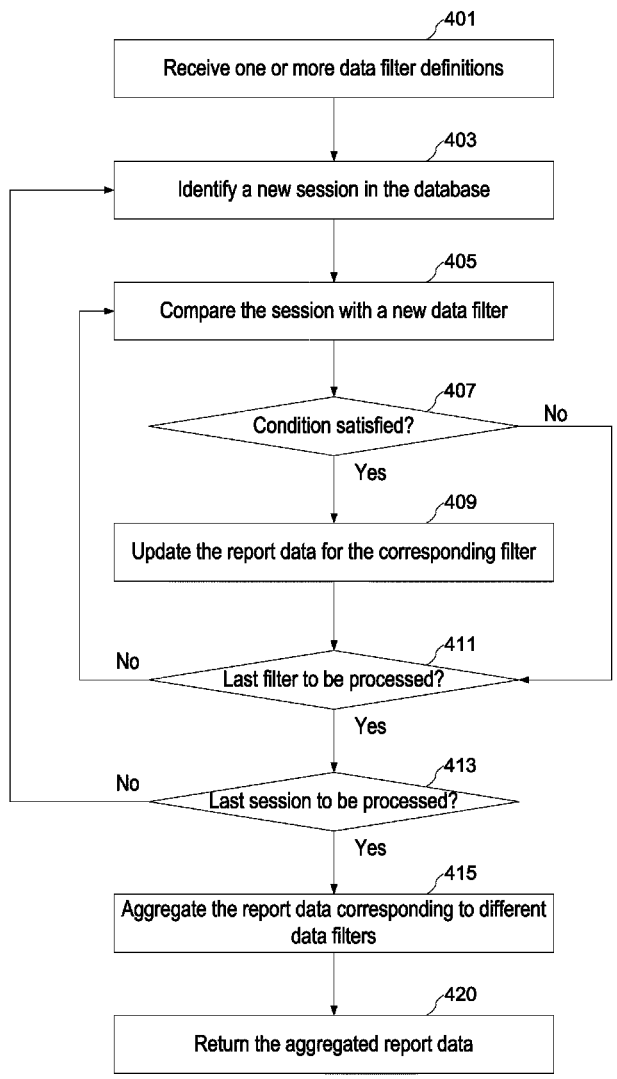
FIG. 4A is a flow chart of a process for counting the number of visits that satisfy user-specified filters in accordance with some embodiments.

FIG. 4A is an overview flow chart of a process for counting the number of sessions or visits that satisfy one or more user-specified data filters in accordance with some embodiments. Note that this process typically occurs at the backend 120 if the server application 110 does not have the data necessary for preparing an analytics report and needs to request the data from the backend 120. As will be explained below, a user-specified data filter typically includes an attribute of the multidimensional web traffic dataset and a filter condition, both being user-specified at a client device. An application of the data filter to a set of data records at the backend 120 is to examine the content item corresponding to the user-specified attribute within each data record and identify those data records whose content items satisfy the user-specified filter condition.

The backend 120 receives one or more data filter definitions from the server application 110 (401). For example, to determine the bounce rate of a web site for a given time period, the backend 120 may need to count (i) the total number of visits made by different users during the time period and (ii) the total number of a subset of the visits during which users view only a single web page at the web site and then leave the web site. In this case, the determination of each respective total number corresponds to a data filter definition. The data filter definition may be written in a standard database query language or a proprietary database query language that is developed for processing the web traffic data stored in a multidimensional dataset.

The database server 123 identifies a new session in the data structure 200 (403) and compares the session's content items with a new data filter's filter condition (405). If the session meets the filter condition (407, yes), the database server 123 updates the report data for the corresponding data filter (409) and optionally increments the total number of the satisfying data records by one. If the data filter is the last one to be processed (411, yes), the database server 123 checks whether this session record is the last one in the data structure 200 to be processed (413). Otherwise (411, no), the database 120 returns to compare the same session record with the next user-specified data filter and update the report data accordingly. The backend 120 processes the sessions one by one until it finishes processing the last session (413, yes). In some embodiments, the backend 120 also aggregates the report data corresponding to different data filters (415), e.g., determining the bounce rate by dividing the total number of "bounced" visits by the total number of visits, and returns the aggregated data to the server application 110 for preparing the analytics report (420). In some other embodiments, the backend 120 returns the results corresponding to different data filters to the server application 110 and the server application then performs the aggregation operation as described above.

Given the nature of web traffic data stored in a multidimensional dataset, most user requests for visualizing the web traffic data are effectively to "slice and dice" the dataset in a user-specified manner as defined by one or more data filters and the relationships between the data filters. A client device 102 is responsible for submitting the user requests to the server system 106 and the server system is responsible for identifying a subset of the dataset for each user request and generating a view of data including the subset of the dataset and information derived from the subset to be presented to an end user at the client device 102. For convenience, a specific type of user request called "segment request" and related subjects are described in more detail below. But it would be apparent to one of ordinary skill in the art that the same approach is applicable to many types of user request corresponding to the different visualization tools such as table, bar chart, pie chart, curve, map, pivot table, etc.

A segment request corresponds to a user-defined dataset segment scheme for extracting a subset of data records from a set of data records associated with a particular user within a database. In some embodiments, the set of data records are web traffic sessions or visits generated at a particular web site and the user refers to one or more individuals who are affiliated with the web site and authorized to access the set of data records managed by the server system 106. There are many reasons for a user to segment a set of web traffic data records and extract useful information from the segmented dataset. For example, a manager or an owner of an online shopping web site may be interested in researching the customer activities for a certain period of time to identify a group of customers that is more (or less) likely to purchase certain types of products and then designing more customized marketing strategies at those existing customer visitors as well as those non-customer visitors to "convert" them into existing customers by providing more product items that fit into their shopping habits. To do so, the web site manager needs to have a user-friendly tool for "carving out" that specific group of visitors by defining the criteria for a certain segment of customers.

As will be explained below, the user defines a dataset segment scheme by specifying one or more data filters through a graphical user interface, each data filter having at least one attribute and one associated filter condition. The different data filters are related to one another through logic conjunctive or logic disjunctive operations. To allow a user to resubmit a previously-defined dataset segment scheme without having to reenter the scheme, the server system 106 is responsible for generating a corresponding dataset segment scheme when it receives the segment scheme from the user for the first time and returning a segment identifier to the user. The user can resubmit the same request to the server system as long as the resubmitted segment request includes information such as the segment identifier that identifies the dataset segment scheme.

Figure 4B:
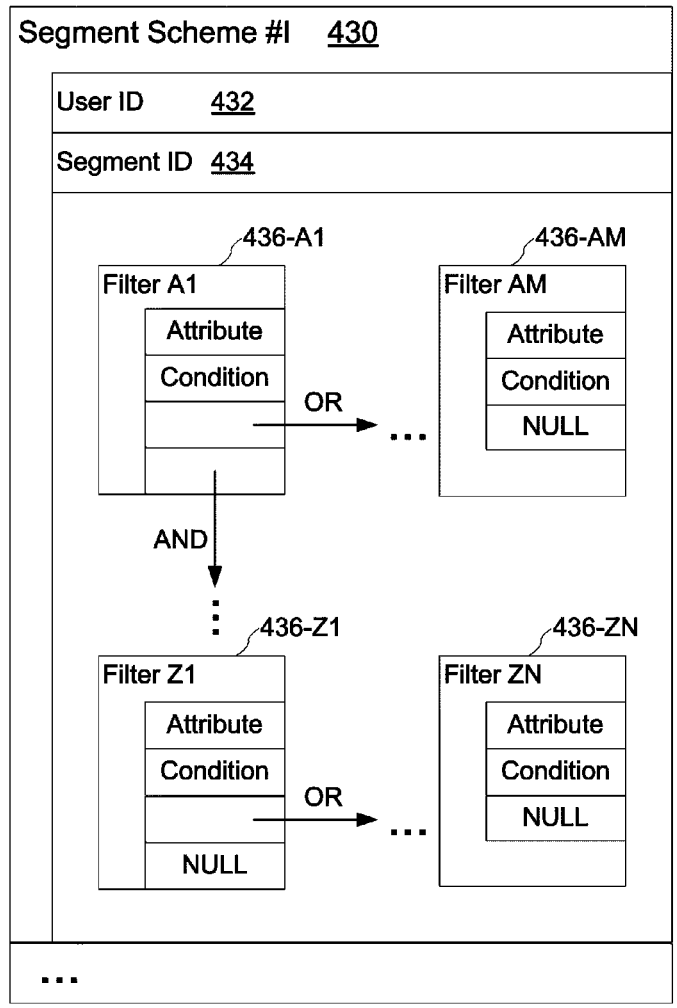
FIG. 4B is a block diagram of a data structure for storing a dataset segment scheme at a server system in accordance with some embodiments.

FIG. 4B is a block diagram of a data structure for storing a dataset segment scheme at a server system in accordance with some embodiments. The server system generates the dataset segment scheme 430 in response to a user-defined client request to segment a dataset. The scheme 430 includes a user ID 432 that identifies the user who initiates the client request, a segment ID 434 for uniquely identifying the scheme 430 in the server system, and one or more user-defined data filters 436. A data filter includes an attribute of the dataset and a filter condition associated with the attribute. For example, one data filter may be specified to identify all sessions whose country (i.e., attribute) matches exactly "United States" (i.e., filter condition).

In some embodiments, the multiple data filters are organized into a multi-layer data structure, each layer including one or more data filters (e.g., 436-A1 and 436-AM being one layer while 436-Z1 and 436-ZM being another layer) that are related to one another through logic disjunctive operations and different layers of data filters being related to each other through logic conjunctive operations. In Boolean logic, such expression is equivalent to a formula in conjunctive normal form (CNF). An advantage of defining segments in this form is that any logical expression can be formed using CNF expressions, which means that a user has practically unlimited flexibility in defining ways of segmenting a multidimensional dataset. Note that there are many known ways of representing the CNF formula in the server system, including a linked list as shown in FIG. 4B or a text string as follows:

[(Filter A1, Attribute, Condition) OR . . . (Filter AM, Attribute, Condition)]
AND . . .
[(Filter Z1, Attribute, Condition) OR . . . (Filter ZN, Attribute, Condition)]

For each user-defined dataset segment scheme, the server system generates a dataset segment scheme and returns the corresponding segment ID to the requesting client. When a user subsequently submits a request for segmenting the dataset in accordance with the dataset segment scheme, the user does not need to reenter the definition for the dataset segment scheme. Instead, the user request needs to include the segment ID of the dataset segment scheme previously stored at the server system and the server system can then identify those data filters associated with the segment scheme and perform operations based on the data filters. The association of a segment ID with a dataset segment scheme also enables different users to share their dataset segment schemes. This feature is useful for different users of a web analytics application to exchange their knowledge of and experience with the dataset.

Figure 4C:
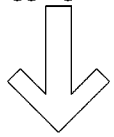
FIG. 4C is a block diagram of multiple data structures for storing data filtering and segment results at a server system in accordance with some embodiments.

FIG. 4C is a block diagram of multiple data structures for storing data filtering and segment results at a server system in accordance with some embodiments. As shown in FIG. 3, the server application 110 applies the data filters to the backend 120 if it does not have the data records for responding to a client device's segment request (308, no) and prepares the requested report after receiving the segment results from the backend 120 (318). In some embodiments, the data filters are applied to the backend 120 independently. For each data filter, the backend 120 returns a subset of data records (450-F1 and 450-FN) that satisfies the corresponding filter condition. A respective data record includes multiple attributes some of which are dimension attributes such as "Date" (455-F1, 455-FN), "Country" (457-F1, 457-FN) and some of which are metric attributes such as "Pageviews" (459-F1, 459-FN). In addition, each data record includes a "User ID" attribute (451-F1, 451-FN) identifying the user who submits the segment request and a "Session ID" (453-F1, 453-FN) that identifies the session that satisfies the filter condition.

The server application 110 has access to the dataset segment scheme corresponding to the data filters used for generating the subsets of data records. To prepare a report in response to the segment request, the server application 110 aggregates the multiple subsets of data records 450-F1, 450-FN into a result set of data records 460 in accordance with relationships between the different data filters as defined by the dataset segment scheme. For example, for two data filters that are within the same layer of the dataset segment scheme, the server application 110 applies a logic disjunctive operation to the two subsets of data records to identify a new set of data records each of which appears in at least one of the two subsets of data records. For two data filters that are within the different layers of the dataset segment scheme, the server application 110 applies a logic conjunctive operation to the two subsets of data records to identify a new set of data records each of which appears in both of the two subsets of data records. The result set of data records and additional information derived therein (e.g., the average pageviews of the data records within the result set) are used for generating the user-requested segment report.

To further illustrate how the server application 110 prepares the segment report, FIG. 4D includes a block diagram of an example of aggregating data filtering results into a segment result in accordance with some embodiments.

The raw data 470 corresponds to a set of data records associated with a particular user and stored in the backend 120. This set of data records is the target of a segment request. The segment request corresponds to a dataset segment scheme that has three data filter definitions 472. Filter A specifies that the data records that satisfy the filter should be those data records whose country matches exactly United States. Filter B specifies that the data records that satisfy the filter should be those data records whose pageview is greater than 6. Filter C specifies that the data records that satisfy the filter should be those data records whose browser matches exactly Firefox.

The application of the three filters to the raw data 470 produces three subsets of data records. The subset 474-A for the filter A includes three data records, each data record having a Country attribute of US. The subset 474-B for the filter B includes four data records, each data record having a pageview attribute of at least 7. The subset 474-C for the filter C includes three data records, each data record having a browser attribute of Firefox. An aggregation of the three subsets 474-A, 474-B, and 474-C results in the segment result 476 that includes one data record that satisfies all the three filters.

Figure 5:
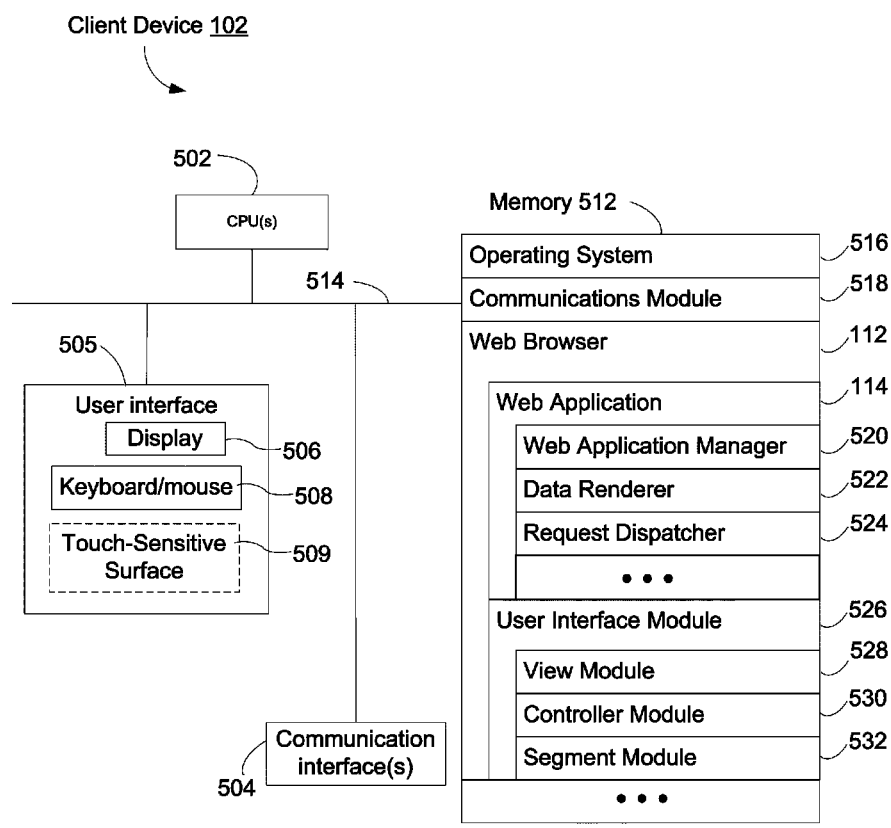
FIG. 5 is a block diagram of a client device for visualizing traffic data in accordance with some embodiments.

FIG. 5 is a block diagram of a client device 102 for visualizing web traffic data in accordance with some embodiments. The client device 102 generally includes one or more processing units (CPU's) 502, one or more network or other communications interfaces 504, memory 512, and one or more communication buses 514 for interconnecting these components. The communication buses 514 may include circuitry (sometimes called a chipset) that interconnects and controls communications between components. The client device 102 may optionally include a user interface 505, for instance, a display 506, a keyboard and/or mouse 508, and a touch-sensitive surface 509. Memory 512 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 512 may include mass storage that is remotely located from the central processing unit(s) 502. Memory 512, or alternately the non-volatile memory device(s) within memory 512, comprises a non-transitory computer readable storage medium. Memory 512 or the computer readable storage medium of memory 512 stores the following elements, or a subset of these elements, and may also include additional elements:

- an operating system 516 that includes procedures for handling various basic system services and for performing hardware dependent tasks;
- a network communication module 518 that is used for connecting the client device 102 to other servers or computers including the server system 106 via one or more communication network interfaces 504 (wired or wireless), such as the Internet, other wide area networks, local area networks, and metropolitan area networks and so on;
- a client application 112 (e.g., a web browser), including one or more client assistants 114 (e.g., toolbar, browser plug-in) for monitoring the activities of a user; in some embodiments, the client assistant 114, or a portion thereof, may include a web application manager 520 for managing the user interactions with the web browser, a data render 522 for supporting the visualization of an analytics report, and a request dispatcher 524 for submitting user requests for new analytics reports; and
- a user interface module 526, including a view module 528 and a controller module 530, for detecting user instructions to control the visualization of the analytics reports. In some embodiments, the user interface module 526 further includes a segmentation module 532 for displaying a segmentation/filter definition template and receiving user instructions for building a dataset segment scheme using the template (see, e.g., descriptions below in connection with FIGS. 8A to 8C).

Figure 6:
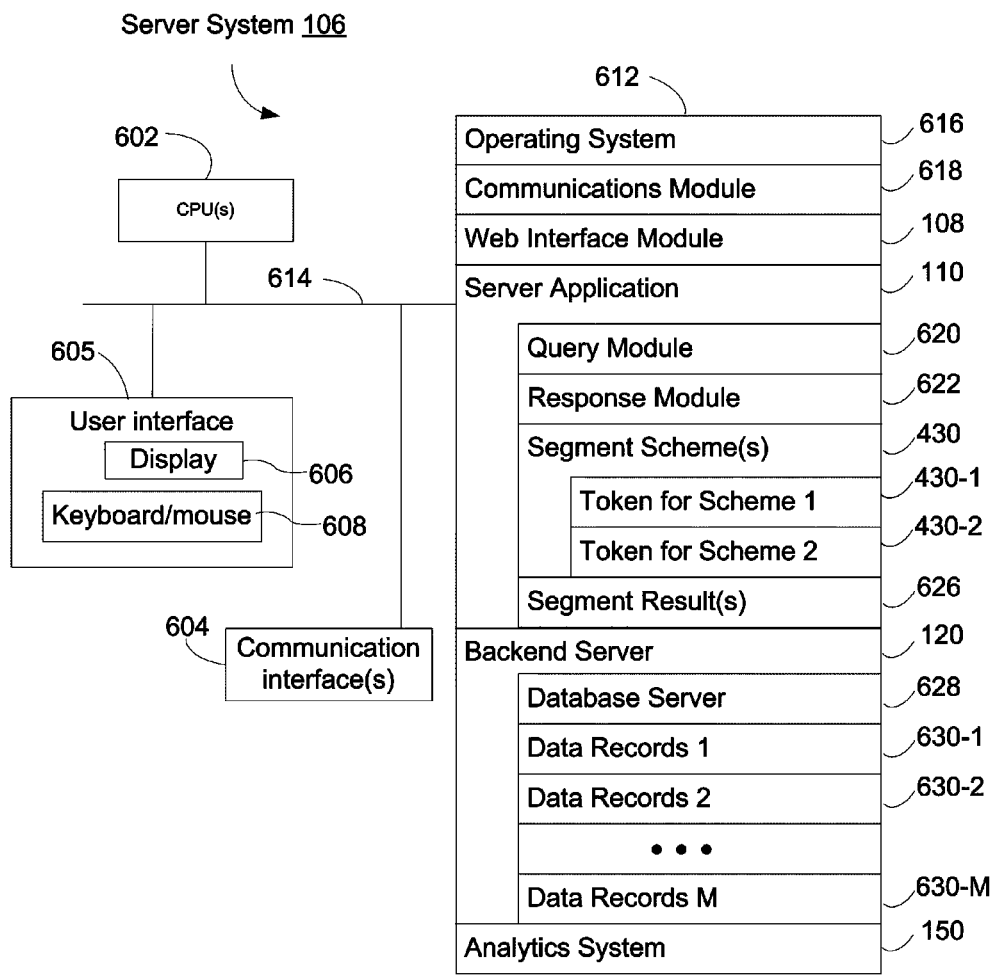
FIG. 6 is a block diagram of a server system for generating views of traffic data to be displayed at a requesting client device in accordance with some embodiments.

FIG. 6 is a block diagram of a server system 106 for generating views of traffic data to be displayed at a requesting client device in accordance with some embodiments. The server system 106 generally includes one or more processing units (CPU's) 602, one or more network or other communications interfaces 604, memory 612, and one or more communication buses 614 for interconnecting these components. The server system 106 may optionally include a user interface 605 comprising a display device 606 and a keyboard 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a computer readable storage medium. Memory 612 or the computer readable storage medium of memory 612 stores the following elements, or a subset of these elements, and may also include additional elements:

- an operating system 616 that includes procedures for handling various basic system services and for performing hardware dependent tasks;
- a network communication module 618 that is used for connecting the server system 106 to other computers such as the clients 102 and the web servers 130 via the communication network interfaces 604 (wired or wireless) and one or more communication networks, such as the Internet, other wide area networks, local area networks, metropolitan area networks, and so on;
- a web interface module 108 for receiving requests from client devices and returning reports in response to the client requests;
- a server application 110, including a query module 620 for converting client requests into one or more queries or data filters and dataset segment schemes 430 targeting at the backend 120 and a response module 622 for preparing analytics reports based on the response from the backend 120 including the segment results 626; in some embodiments, each dataset segment scheme has an associated token that includes both the user ID and the segment ID of the corresponding scheme;
- a backend 120 including a database server 628 and a large number of data records 630-1 to 630-M such as the session data records shown in FIG. 2; and
- a web analytics system 150 for pre-processing the log files into the sessionized web traffic data records 630-1 to 630-M.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 and 612 may store a subset of the modules and data structures identified above. Furthermore, memory 512 and 612 may store additional modules and data structures not described above.

FIGS. 5 and 6 are intended more as functional descriptions of the various features of a client device and server system rather than a structural schematic of the embodiments described herein. In practice, and as recognized by those of ordinary skill in the art, items shown separately could be combined and some items could be separated. For example, some items shown separately in FIG. 6 like the web interface module 108 and the server application 110 could be implemented on single servers and single items like the database 120 could be implemented by one or more servers. The actual number of server computers used to implement the server system 106, and how features are allocated among them will vary from one implementation to another, and may depend in part on the amount of data traffic that the system must handle during peak usage periods as well as during average usage periods.

Figure 7A:
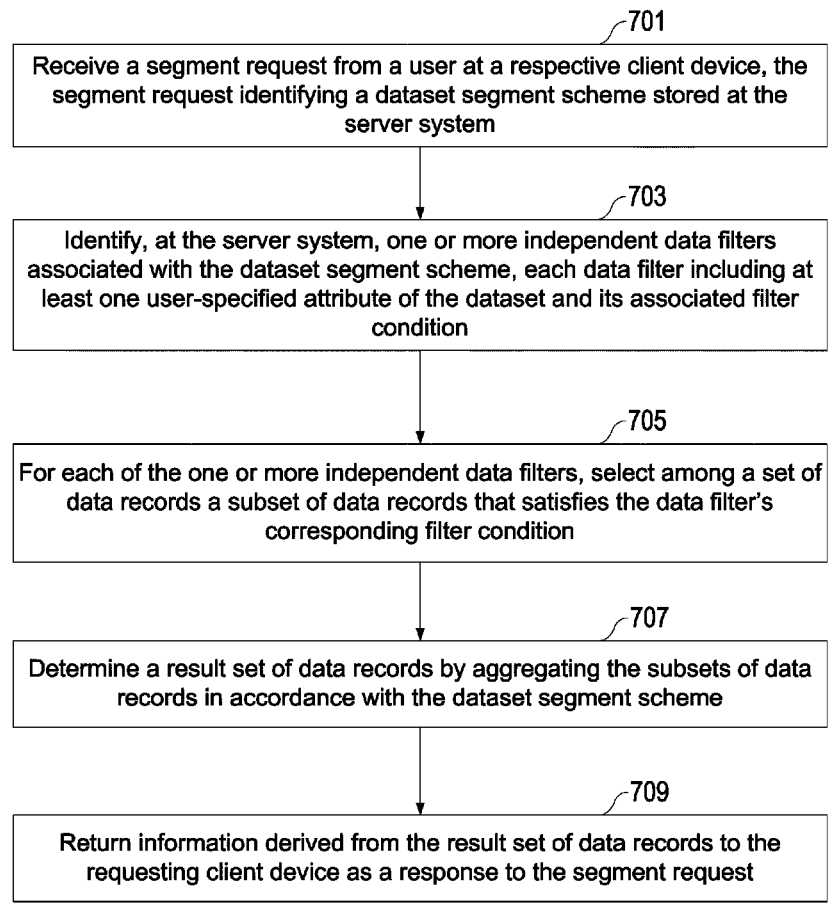
FIG. 7A is a flow chart of a computer-implemented method for processing a segment request at a server system in accordance with some embodiments.

FIG. 7A is a flow chart of a computer-implemented method for processing a request for segmenting a multidimensional dataset at a server system in accordance with some embodiments. The multidimensional dataset is characterized by a set of dimension attributes and a set of metric attributes.

The server system initially receives a segment request from a user at a respective client device (701). The segment request includes a segment ID identifying a dataset segment scheme previously generated and stored at the server system. In some embodiments, the segment request is received in connection with the request to test a dataset segment scheme that is under construction. In this case, the server system may not have a previously-generated dataset segment scheme for the test request. Instead, the segment request includes the definition of data filters corresponding to the scheme, a user-provided dataset segment name, and a parameter such as a flag indicating that the request is for testing the user-provided data filters. A more detailed description of this embodiment is provided below in connection with FIGS. 10E and 10F. In some embodiments, the dataset segment scheme is expressed in the form of a CNF logic formula to simplify the process of the server application 110 applying the dataset segment scheme to the backend 120.

Upon receipt of the segment request, the server application 110 identifies one or more independent data filters associated with the dataset segment scheme and submits the independent data filters to the backend 120 for further processing (703). As described above in connection with FIGS. 4B to 4D, each data filter includes at least one user-specified attribute of the dataset and its associated filter condition. For each of the one or more independent data filters, the backend 120 selects among a set of data records a subset of data records that satisfies the data filter's corresponding filter condition (705) and returns the subset of data records to the server application 110. A more detailed description of the application of a data filter to a set of data records is provided below in connection with FIG. 7B. The server application 110 then aggregates the subsets of data records into a result set of data records in accordance with the dataset segment scheme (707) and returns the result set of data records and information derived from the result set of data records to the requesting client device as a response to the segment request (709). Aggregation of the subsets of data records includes a logic conjunctive operation by identifying a subset of data records that appears in both two subsets of data records or a logic disjunctive operation by identifying a subset of data records that appears in at least one of the two subsets of data records. In some embodiments, the derived information includes a data record count of a subset of data records corresponding to a respective data filter and a data record count of the result set of data records. In some other embodiments, the derived information includes an average of the content items in the result set of data records that correspond to a respective metric attribute of the dataset.

In some embodiments, the backend 120 applies the independent data filters to the set of data records simultaneously for selecting the respective subsets of data records. For example, the backend 120 may not wait until the completion of processing one data filter before it starts processing another data filter. These parallel operations are possible because the data filters are independent from each other and the operation of one data filter does not depends on the operation of another filter.

In some embodiments, a second user can submit a segment request corresponding to a dataset segment scheme defined by a first user. In other words, the first user who specifies the attributes and the respective associated filter conditions of the dataset segment scheme is different from the second user who submits the segment request. In some embodiments, the server system generates the dataset segment scheme in response to an HTTP request from the second user that corresponds to a URL link that includes a segment ID identifying another dataset segment scheme defined by the first user and stored in the server system. In this case, the server system duplicates the other dataset segment scheme and gives a new user ID and segment ID to the duplicated one as the dataset segment scheme associated with the user selects the URL link.

Figure 7B:
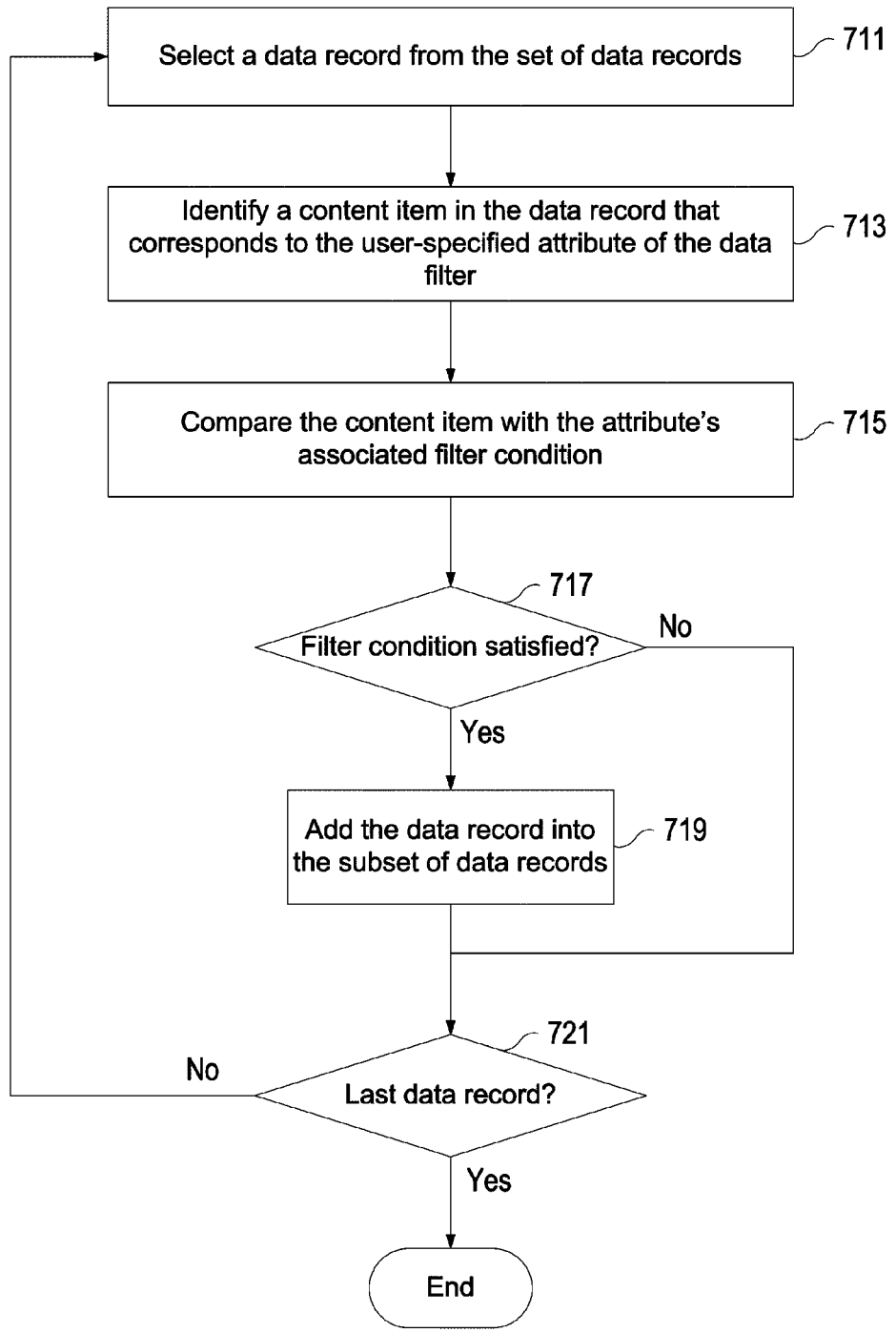
FIG. 7B is a flow chart of a computer-implemented method for selecting from a set of data records those data records that satisfy a particular data filter in accordance with some embodiments.

FIG. 7B is a flow chart of a computer-implemented method for selecting from a set of data records those data records that satisfy a particular data filter in accordance with some embodiments.

Given a set of data records and a data filter associated with a user, the backend 120 selects a particular data record from the set (711) and identifies a content item in the data record that corresponds to a user-specified attribute in the data filter (713) and compares the content item with the attribute's associated filter condition (715). Referring to the example shown in FIG. 4B, the attribute of the filter A is "Country" and the corresponding filter condition is that a satisfying data record is the one whose "Country" attribute matches exactly "US." Therefore, the backend 120 identifies the country name in each data record of the raw data 470 and checks whether the country name is US or not. If the filter condition is met (717, yes), the backend 120 then adds the record into the subset of data records (719), which is to be returned to the server application as the corresponding filter result. This process repeats until the last data record is processed (721, yes).

As noted above, the data filters within a dataset segment scheme are organized into a CNF logic formula by the server application 110 so that different data filters can be applied to the backend 120 independently. In some embodiments, a set of graphical user interfaces is provided at a client device 102 such that the user-provided data filter definitions through the graphical user interfaces can be easily converted into the CNF format at the server system 106. For illustrative purpose, three exemplary sets of graphical user interfaces and the corresponding processes implemented at the client devices are described below.

Figure 8A:
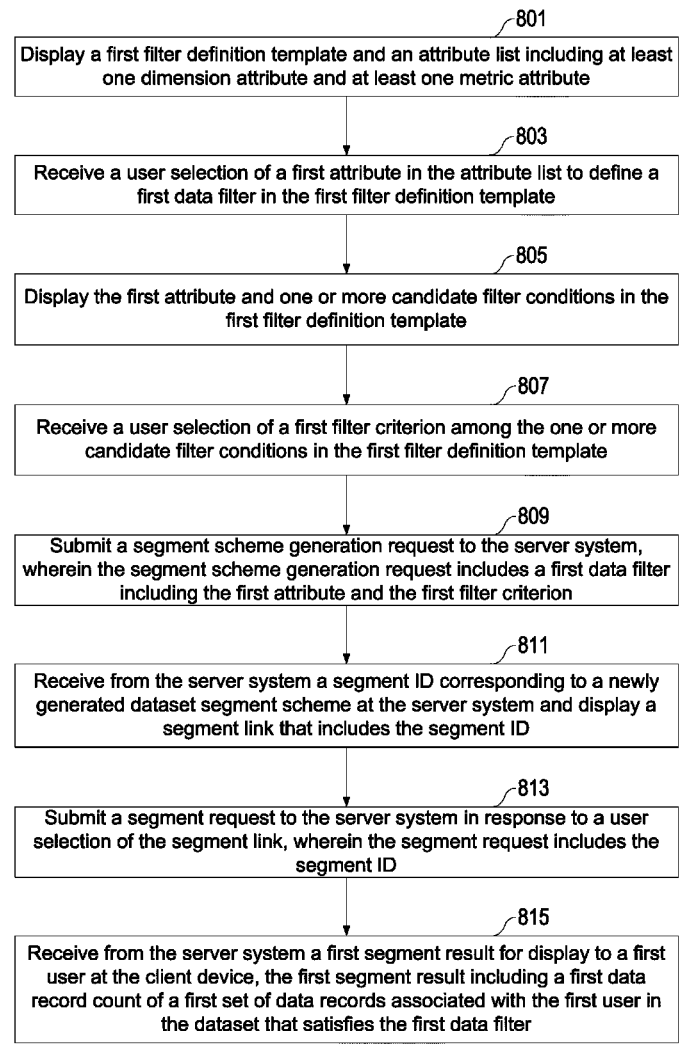
FIG. 8A is a flow chart of a computer-implemented method for generating a dataset segment scheme at a client device in accordance with some embodiments.
Figure 8B:
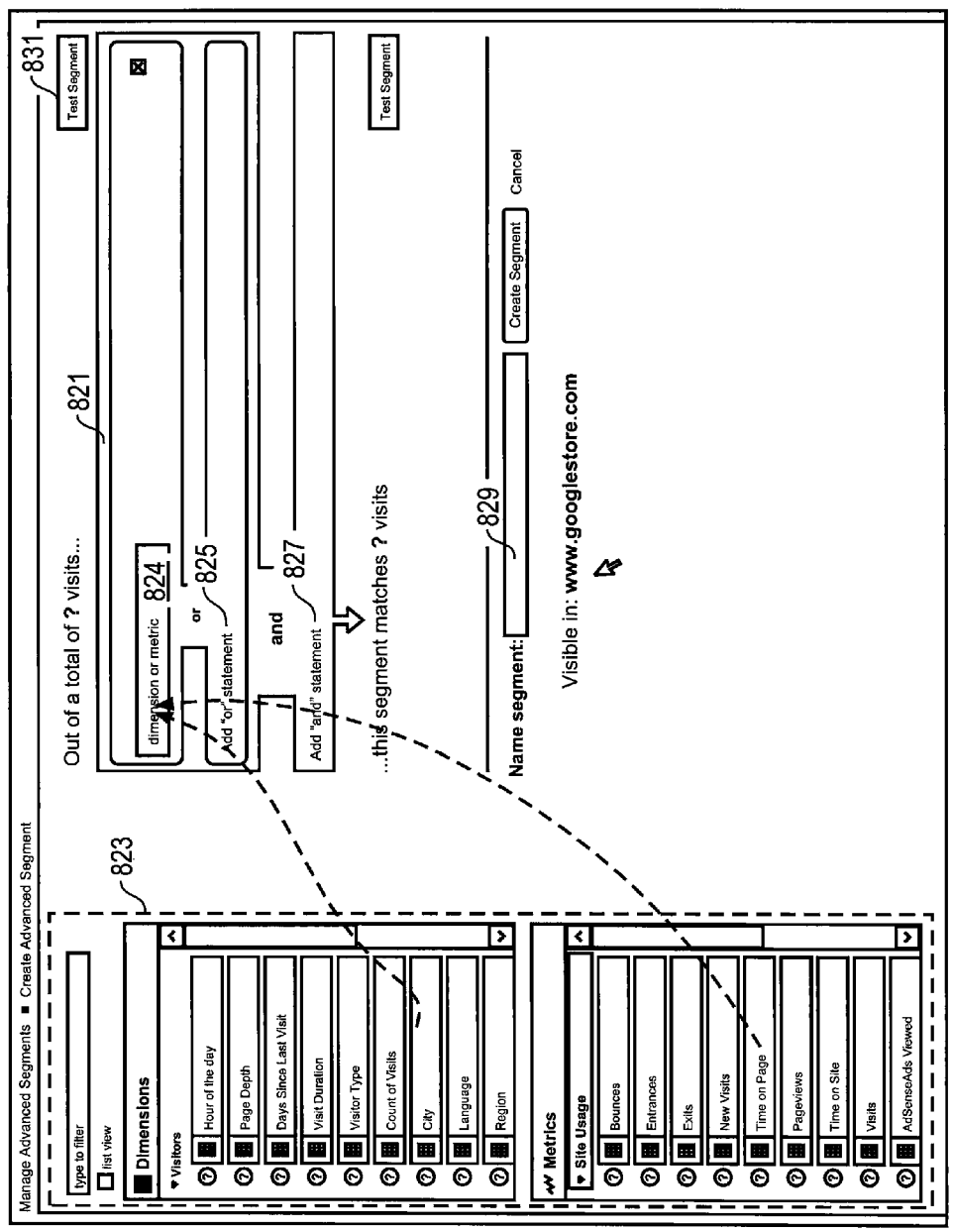
FIG. 8B is a screenshot of a graphical user interface that generates a data filter in a filter definition template upon detection of user instructions through the interface in accordance with some embodiments.
Figure 8C:
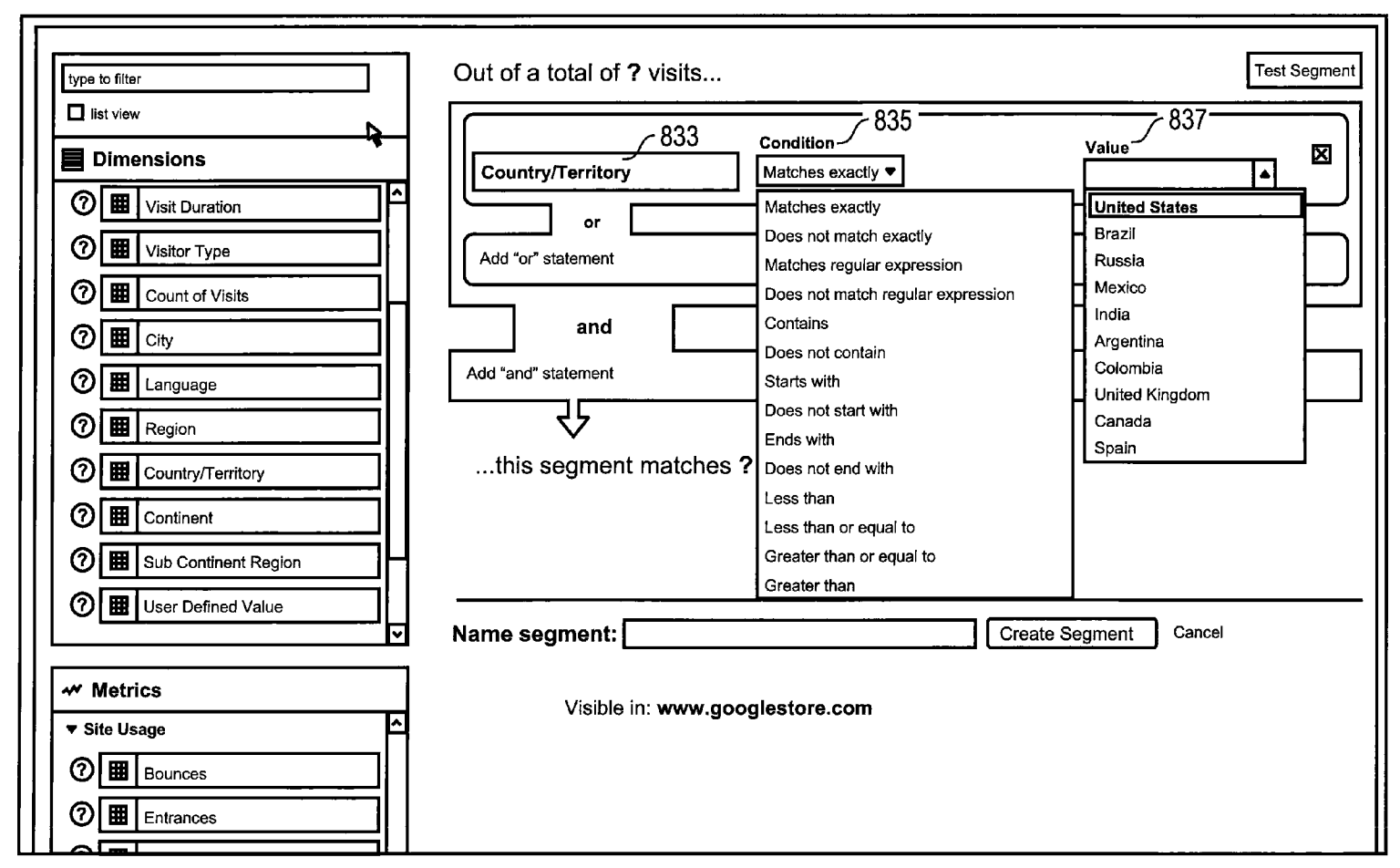

FIG. 8A is a flow chart of a computer-implemented method for generating a segment request at a client device in accordance with some embodiments. FIG. 8B is a screenshot of a graphical user interface that generates a data filter in a filter definition template upon detection of user instructions through the interface in accordance with some embodiments. FIG. 8C is a screenshot of a graphical user interface that includes a data filter in a filter definition template based on user instructions in accordance with some embodiments.

Initially, the client device displays a first filter definition template and an attribute list including at least one dimension attribute and at least one metric attribute (801). As shown in FIG. 8B, the filter definition template 821 includes a dashed-line box 824 into which a user can drag and drop an attribute from the attribute list 823 into the box. In addition, the filter definition template may include a logic disjunctive link 825 and a logic conjunctive link 827. As further described below in connection with FIGS. 10A to 10D, a user can add more data filters by selecting either link repeatedly. As will be described below in connection with FIGS. 10E and 10F, the "Test Segment" button 831 is used for testing a segment scheme under construction before officially adopting it. The text box 829 is provided for a user to enter a segment name for the segment scheme being constructed. This name is effectively an identifier of the segment scheme at the client side, which is different from the segment ID generated by the server system.

After receiving a user selection of a first attribute in the attribute list to define a first data filter in the first filter definition template (803), the client device displays the first attribute and one or more candidate filter conditions in the first filter definition template (805). As shown in FIG. 8C, in response to a user drag and drop of the attribute "Country/

Territory" 833 into filter definition template, the client device automatically generates a set of candidate conditions in the dropdown list 835 and a set of candidate values in the dropdown list 837.

After receiving a user selection of a first filter condition among the one or more candidate filter conditions in the first filter definition template (807), the client device has sufficient information for generating a data filter to build a new dataset segment scheme in the server system. In some embodiments, a user can repeat the aforementioned process by adding more data filters to the filter definition template. After entering all the user-specified data filter definitions, the user can enter a segment name into the text box 829 and select the "Create Segment" button. In response, the client device submits a segment scheme generation request including the data filter definitions to the server system (809). Upon receipt of the client request, the server system generates a dataset segment scheme like the one shown in FIG. 4B for future use and returns a segment ID of the newly generated dataset segment scheme to the requesting client device. Using the new segment ID, the client device generates a new segment link and displays the segment link together with other segment links in a graphical user interface (811). See, e.g., the list of segment links shown in FIG. 9B.

Subsequently, in response to a user selection of the new segment link, the client device submits a segment request to the server system (813). In some embodiments, the segment request includes the segment ID that corresponds to the dataset segment scheme. At the server system, the server application 110 processes the segment request in a way that is similar to the process described above in connection with FIG. 7A and returns information including a first data record count derived from the result set of data records that satisfies the segment request as a first segment result. Upon receipt of the first segment result, the client device displays information including the first data record count to a first user that submits the segment request (815).

In some embodiments, the process of defining an appropriate dataset segment scheme may require a user to conduct many tests using different filter conditions and different combination of data filters until an appropriate combination of data filters with appropriate filter conditions is identified as being able to providing valuable insights into a multidimensional dataset. Although this process is developed on the basis of a particular set of data records accessible by the user who conducts the tests, the identified dataset segment scheme may be found useful when being applied to a set of data records associated with a different user. An embodiment of how to share a dataset segment scheme defined by a first user with a second user is provided below in connection with FIGS. 9A to 9D.

Figure 9A:
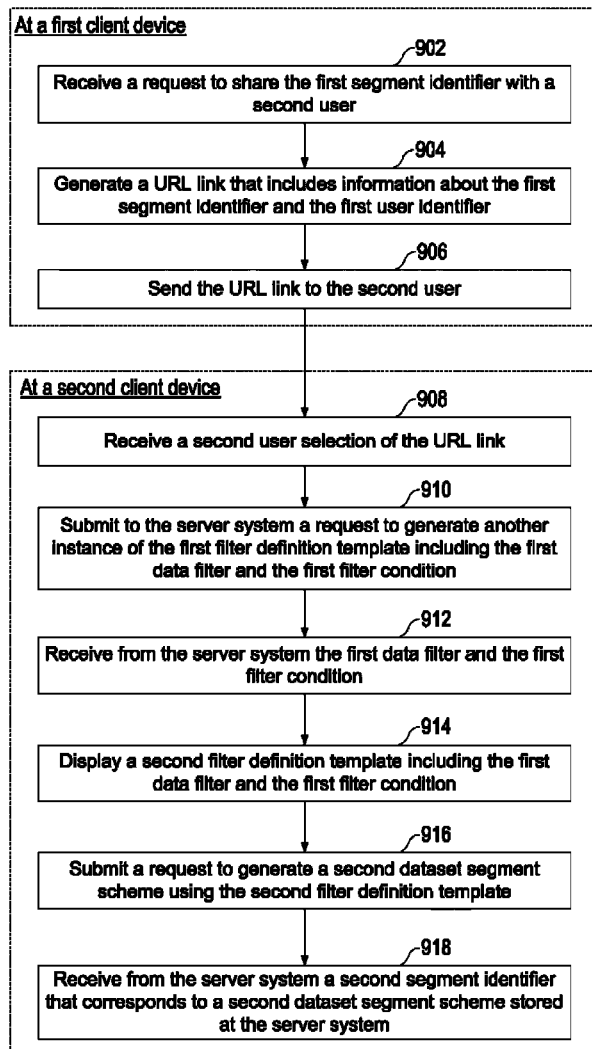
FIG. 9A is a flow chart of a process for sharing a dataset segment scheme between two client devices in accordance with some embodiments.
Figure 9B:
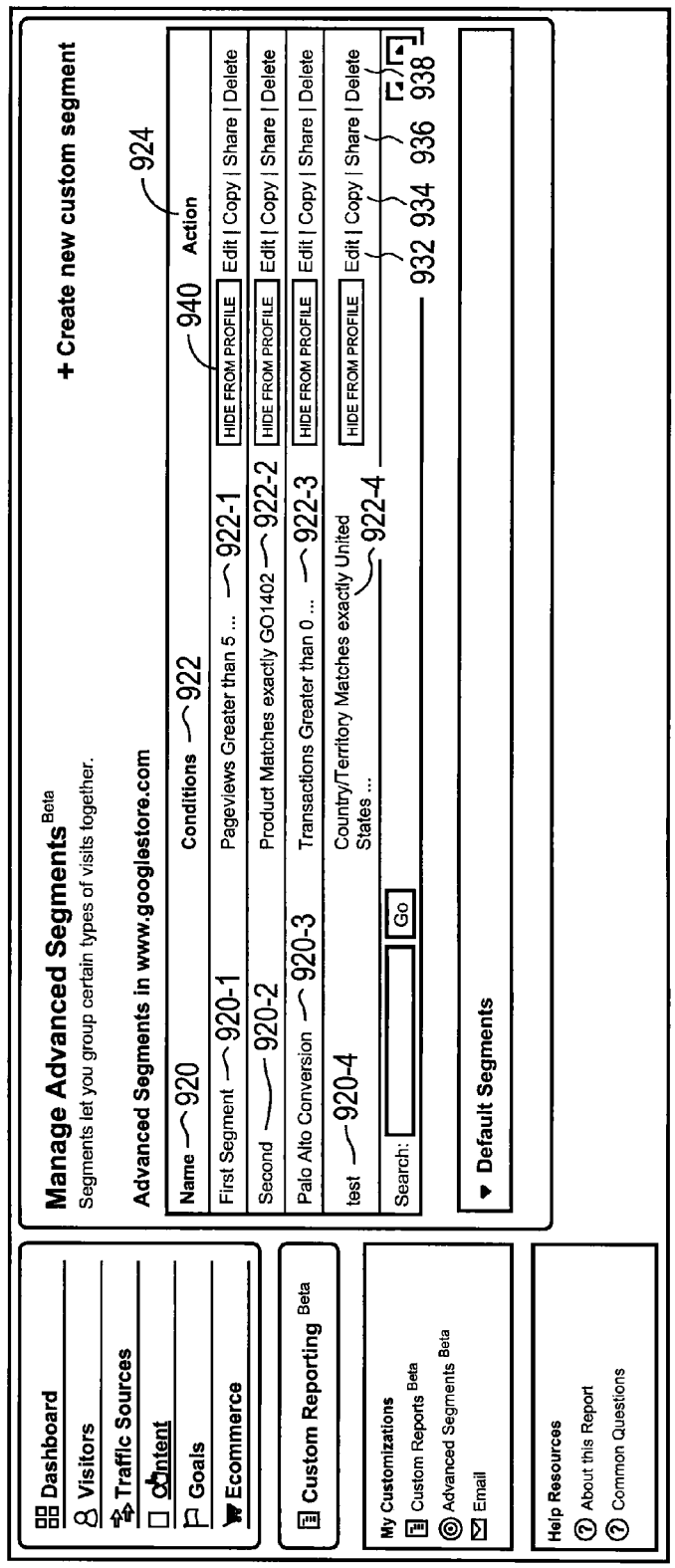
FIG. 9B is a screenshot of a graphical user interface that includes a list of segment links at a first client device in accordance with some embodiments.

FIG. 9B is a screenshot representative of a graphical user interface for managing user-defined segments that includes an exemplary list of segment links 920-1 to 920-4 for a web site (www.googlestore.com) at a first client device in accordance with some embodiments. Each segment link includes a user-provided segment name 920, the filter conditions 922 of a dataset segment scheme, and one or more action items 924. In some embodiments, the user-provided segment name 920 is associated with a URL link that includes the segment ID of the corresponding dataset segment scheme. The filter conditions 922 indicate what type of data records would satisfy the dataset segment scheme. The action items include the "Edit" item 932 for a user to update a preexisting dataset segment scheme, the "Copy" item 934 for a user to duplicate a preexisting dataset segment scheme for its own use, a "Share" item 936 for a user to share the dataset segment scheme with another user, and a "Delete" item 938 for a user to eliminate a dataset segment scheme from the list. In some embodiments, there is a "Hide From Profile" button 940 associated with each segment link and a user selection of the "Hide From Profile" button 940 moves the segment link from the list of active segment schemes to the list of default segment schemes below.

FIG. 9A is a flow chart of a process for sharing a dataset segment scheme between a first client device and a second client device in accordance with some embodiments. In some embodiments, the dataset segment scheme is generated by the server application 110 in response to a previous request from a user at the first client device. The first client device receives a request from a first user to share one of its segment schemes with a second user (902). In response, the first client device generates a segment link that will be shared with a second user (904). In one embodiment, the segment link includes a copy of the segment ID that identifies the user-selected segment scheme and the first user ID. In another embodiment, the segment link includes an encrypted copy (e.g., an encrypted token) of the segment ID and the first user ID. In some embodiments, both segment link and the token (encrypted or not) were generated by the server application 110.

As shown in FIG. 9B, the request could be a user selection of a segment link's corresponding "Share" item 936. FIG. 9C is a screenshot of the graphical user interface after the first client device detects a user selection of the "Share" item 936 for the segment link 920-4 named "test" in accordance with some embodiments. In this case, the first client device generates a small pop-up window and the pop-up window includes a URL link 926 that includes information about the segment ID of the dataset segment scheme the first user plans to share with the second user and the first user ID.

In some embodiments, the first client device sends the URL link to the second user (906). For example, the pop-up window shown in FIG. 9C may include a field for the first user to enter the second user's email address and the URL link can be sent to the second user via email. Alternatively, the first user can make a copy of the URL link in the pop-up window and paste it into an email message. In some embodiments, the first user may post the URL link on a web page (such as a blog) to share the segment scheme with others. In some other embodiments, an application programming interface (API) is provided for a user to define a dataset segment scheme. The API generates a text string including the user-entered information in a format that is to be interpreted by the server system as a dataset segment scheme. The user can share the dataset segment scheme by providing the text string to others. In yet some other embodiments, a Javascript application is provided for a user to enter a segment scheme and the user can then share the Javascript application in conjunction with the user-entered information with other users of this web site or a different web site.

Figure 9D:
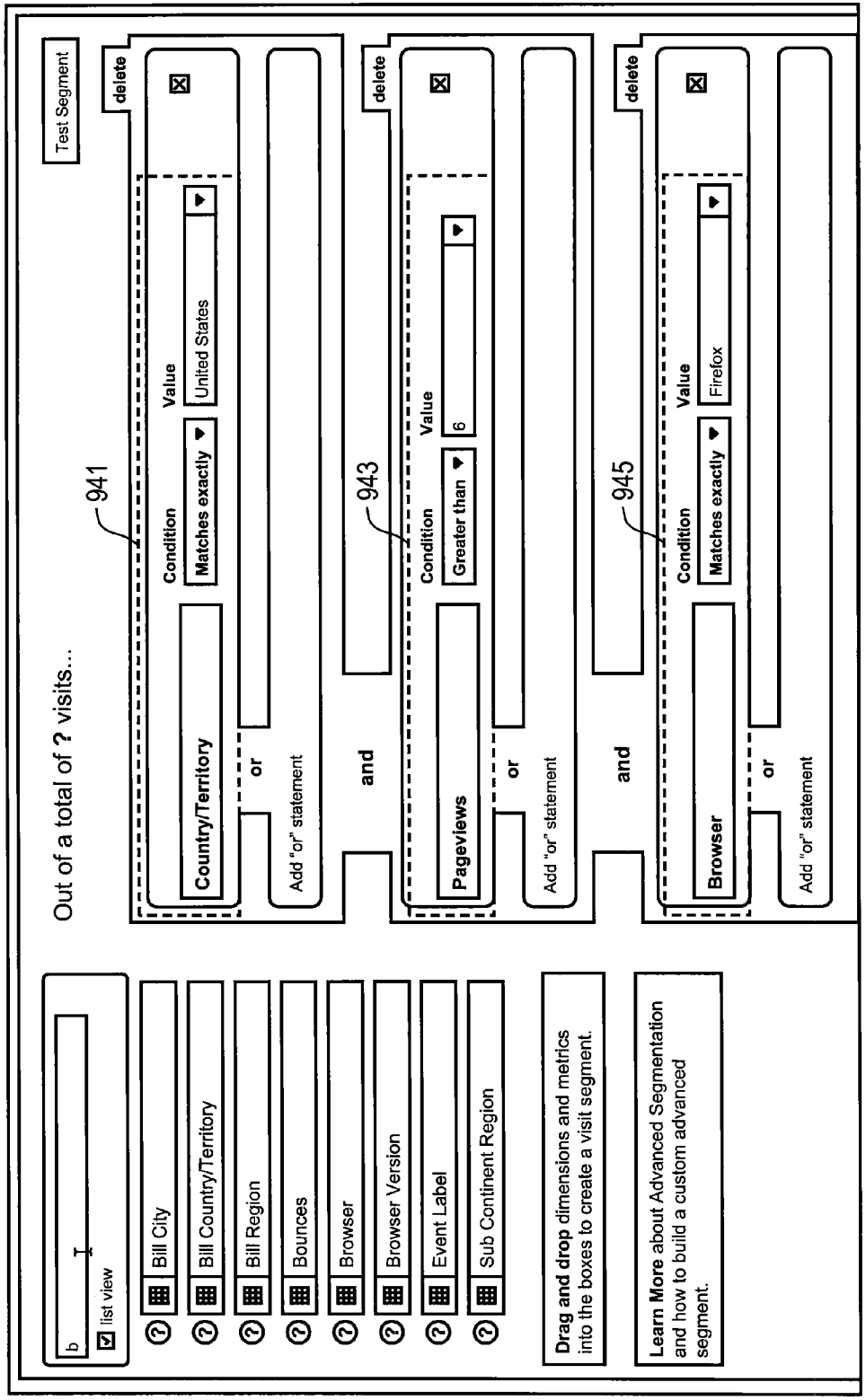
FIG. 9D is a screenshot of a graphical user interface that includes multiple populated filter definition templates at a second client device in accordance with some embodiments.

Upon receipt of the URL link at a second client device (which might be the same as the first client device but is logged in by the second user), the second user can click the link (908), which causes the second client device to submit to the server system a request to generate another instance of the first dataset segment scheme identified by the first segment ID at the second client device (910). In response, the sever system extracts (and decrypts, if necessary) the segment ID and the first user ID from the URL link, loads the first dataset segment scheme identified by the segment ID and first user ID from a server-side storage device, generates a new dataset segment scheme including one or more data filters associated with the second user ID, and returns the data filters defined in the second dataset segment scheme to the second client device. The second client device uses the returned filter definitions to populate a second filter definition template displayed at the second client device (914). FIG. 9D depicts a graphical user interface that includes multiple populated filter definition templates 941, 943, and 945 at the second client device in accordance with some embodiments. In some embodiments, the server system extracts (and decrypts, if necessary) the segment ID and the first user ID from the URL link, loads the first dataset segment scheme identified by the segment ID and first user ID from a server-side storage device, and returns the data filters defined in the first dataset segment scheme to the second client device.

In some embodiments, the server system does not generate any new dataset segment scheme associated with the second user until after it receives further instructions from the second client device. In this case, the second client device then receives a user instruction to submit a request from the second user to generate a second dataset segment scheme at the server system using the information in the second template (916). In response, the server system generates a second dataset segment scheme that is almost identical to the first dataset segment scheme associated with the first user except that the second scheme has a second segment ID and the second user's user ID. The second system returns the second segment ID and the second user ID (both of which may have been encrypted) to the second client device from which the request is submitted. Upon receipt of the second segment ID and the second user ID, the second client device generates a new segment link using the second segment ID and the second user ID that are different from the first segment ID and the first user ID, respectively, and adds the new segment link to the second user's profile like the one shown in FIG. 9B.

In some embodiments, the set of data records associated with the second user may not be the same as the set of data records associated with the first user. For example, the second user may have a higher user privilege and can access more data records generated at a web site than the first user can. In some other embodiments, the second user may have access to a different web site than the first user. Therefore, an application of the second dataset segment scheme to the data records associated with the second user is likely to generate segment results that are completely different from the segment results seen by the first user.

As noted above in connection with FIG. 8B, the filter definition template includes links that allow a user to add more data filters to an existing dataset segment scheme using logic conjunctive or disjunctive operations. Below is a description of an exemplary set of graphical user interface and the corresponding process as depicted in FIGS. 10A to 10D.

Figure 10A:
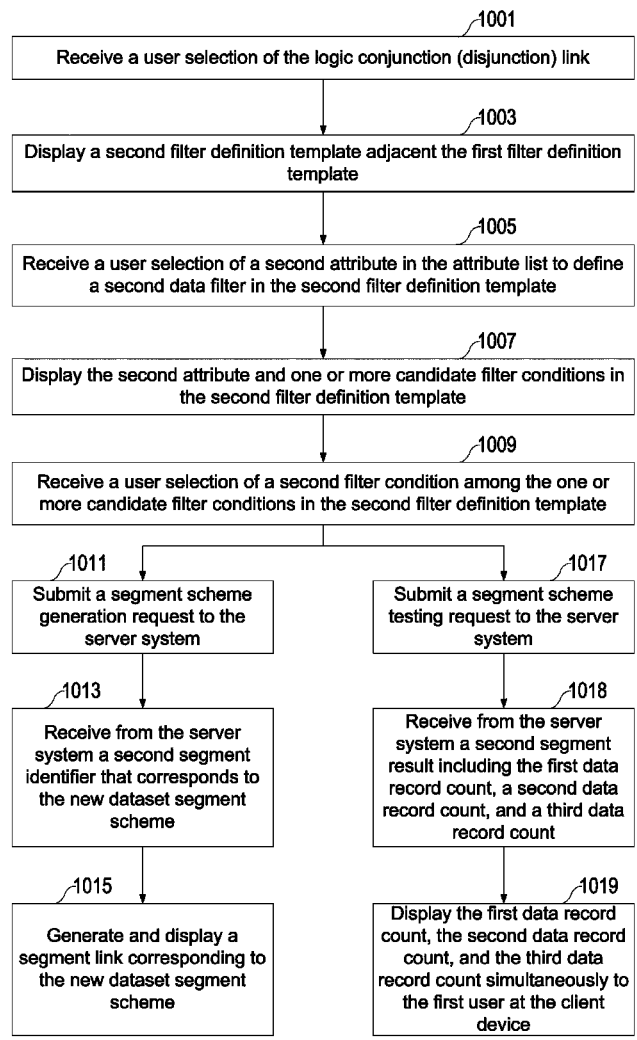
FIG. 10A is a flow chart of a process for adding a new data filter to a filter definition template in accordance with some embodiments.
Figure 10B:
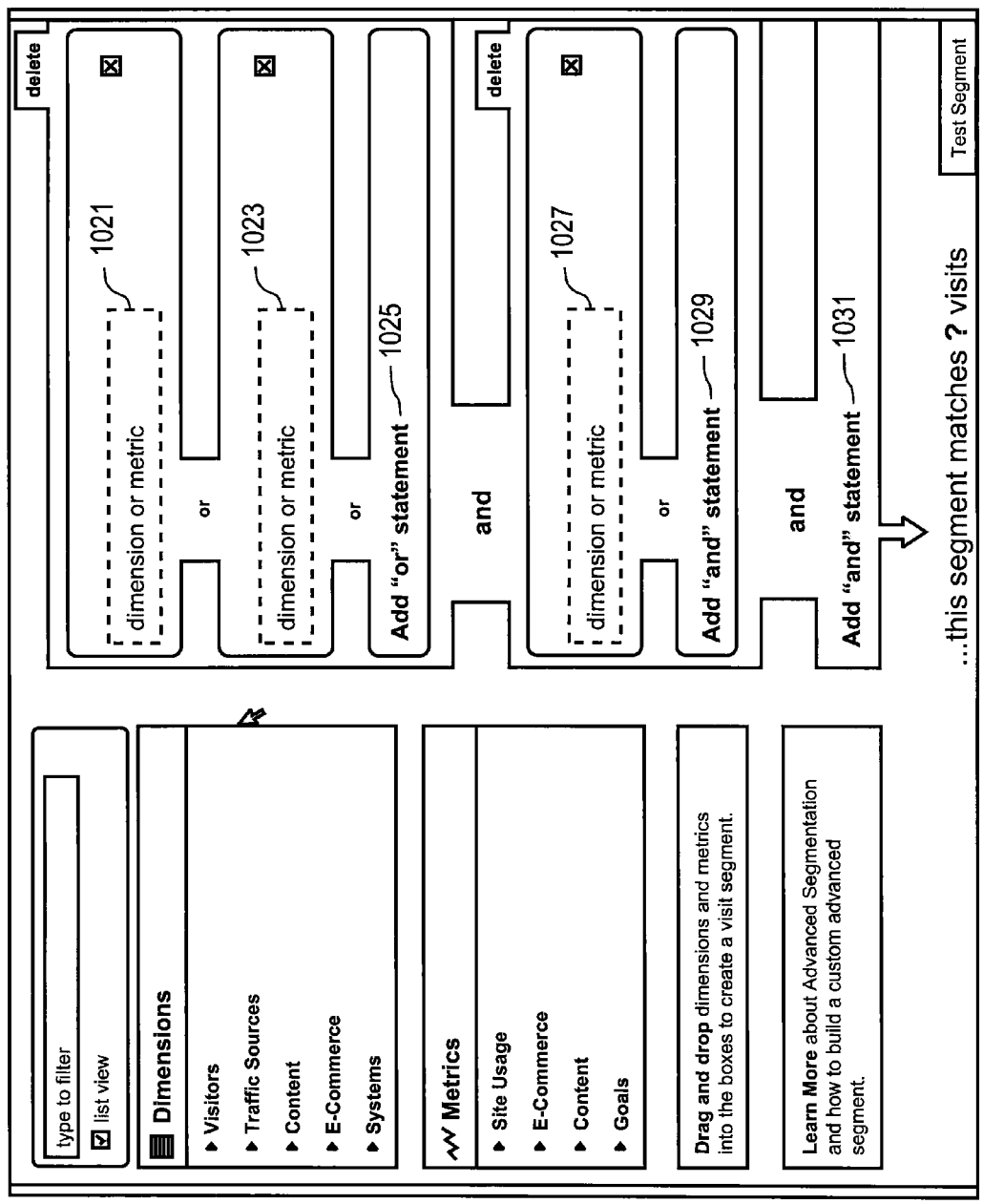
FIG. 10B is a screenshot of a graphical user interface that includes multiple filter definition templates and filter expansion links in accordance with some embodiments.
Figure 10D:
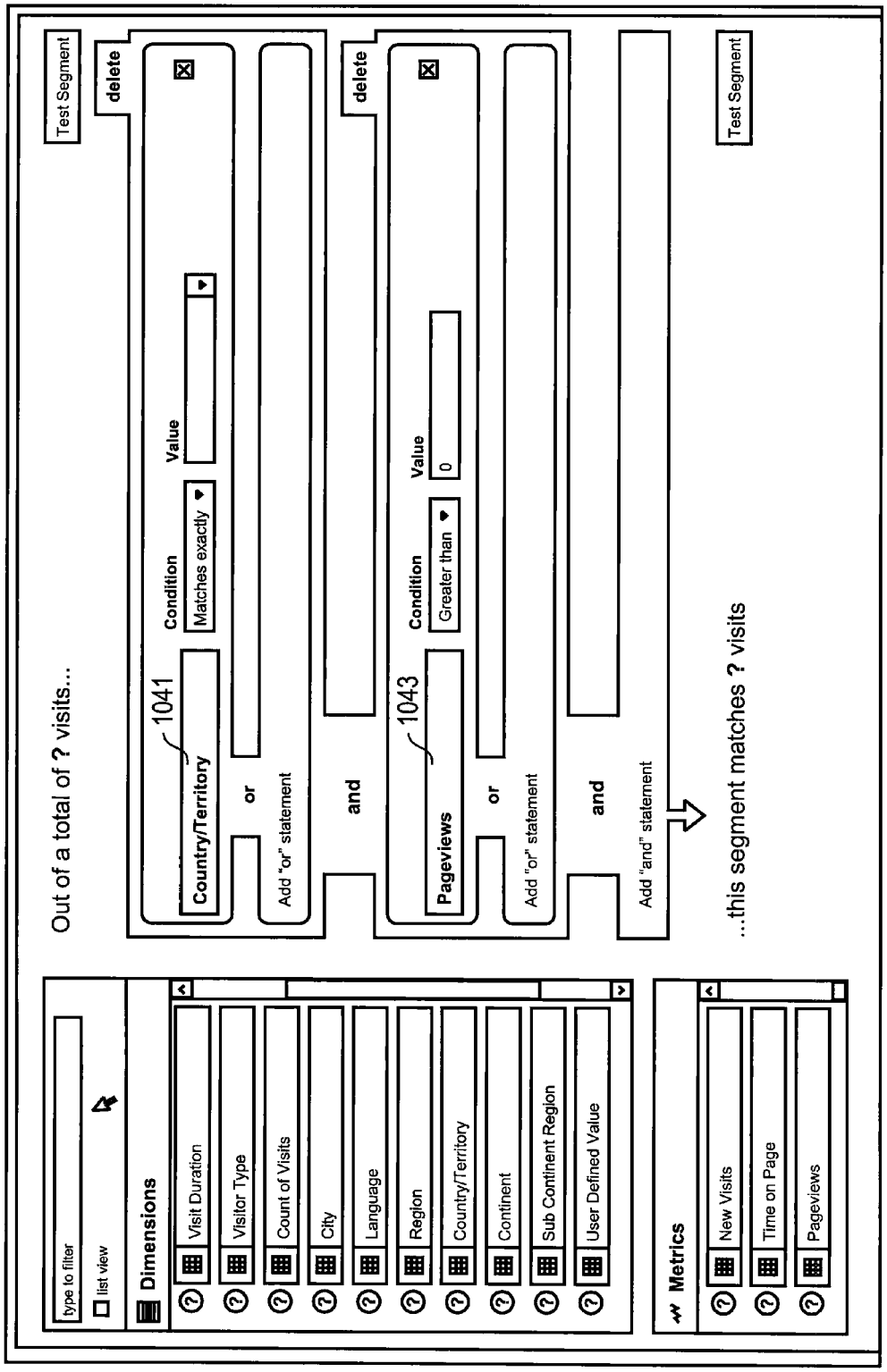
FIG. 10D is a screenshot of a dataset segment scheme that includes two filter definition templates connected by a logic conjunctive operator in accordance with some embodiments.

In some embodiments, upon receiving (1001) a user selection of a logic disjunctive link (825 of FIG. 8B) or a logic conjunctive link (827 of FIG. 8B), the client device generates and displays (1003) a second filter definition template (e.g., 1023 and 1027 of FIG. 10B) adjacent the first filter definition template. Upon receipt of a user selection of a second attribute in the attribute list to define a second data filter in the second filter definition template (1005), the client devices displays the second attribute and one or more candidate filter conditions in the second filter definition template (1007). FIG. 10C depicts a filter definition template that applies a logic disjunctive operation to two attributes, a dimension attribute "Country/Territory" 1033 and a metric attribute "Pageviews" 1035. In contrast, FIG. 10D depicts another filter definition template that applies a logic conjunctive operation to the same two attributes, the dimension attribute "Country/Territory" 1041 and the metric attribute "Pageviews" 1043.

Using the user selection of a second filter condition among the one or more candidate filter conditions in the second filter definition template (1009), the client device submits a segment scheme generation request to the server system (1011). The segment scheme generation request includes first data filter and second data filter as well as a relationship between the two data filters (logic conjunctive or logic disjunctive). The server system then generates a new dataset segment scheme and returns a corresponding segment ID that corresponds to the new dataset segment scheme to the client device (1013). The client device can then generate a segment link including the returned segment ID and display the segment link in the user's profile (1015). Note that the usage of the segment link is the same as the process described above in connection with FIGS. 8A and 9A.

Note that the process of identifying appropriate attributes and filter conditions for a dataset segment scheme is a trial-and-err process that iterates many times. In this case, it would be much less efficient if a user has to create a segment scheme, apply the scheme to a set of data records, view the segment result, and then reopen the filter definition template to modify any data filter.

In some embodiments, after a user enters all the data filter definitions including a segment name and before the user submits a request to generate a corresponding dataset segment scheme at the server system, the client device may allow the user to test the user-provided data filters and adjust the filter definitions on the fly based on the test results. In this case, as shown in FIG. 10A, the client device submits a segment scheme testing request to the server system (1017). Upon receipt of the testing request including the user-provided data filter definitions, the server system performs a process similar to the one shown in FIG. 4A and determines a data record count for each data filter and a data record count for the entire segment scheme. Assuming that the scheme has only two data filters and the two data filters are logically conjunctive to each other, the scheme's data record count equals to the number of data records that satisfy both data filters' filter conditions. Conversely, if the two data filters are logically disjunctive to each other, the scheme's data record count equals to the number of data records that satisfy at least one of the two data filters' filter conditions. Upon receipt of the data record counts (1018), the client device displays them adjacent their corresponding data filters (1019).

Figure 10E:
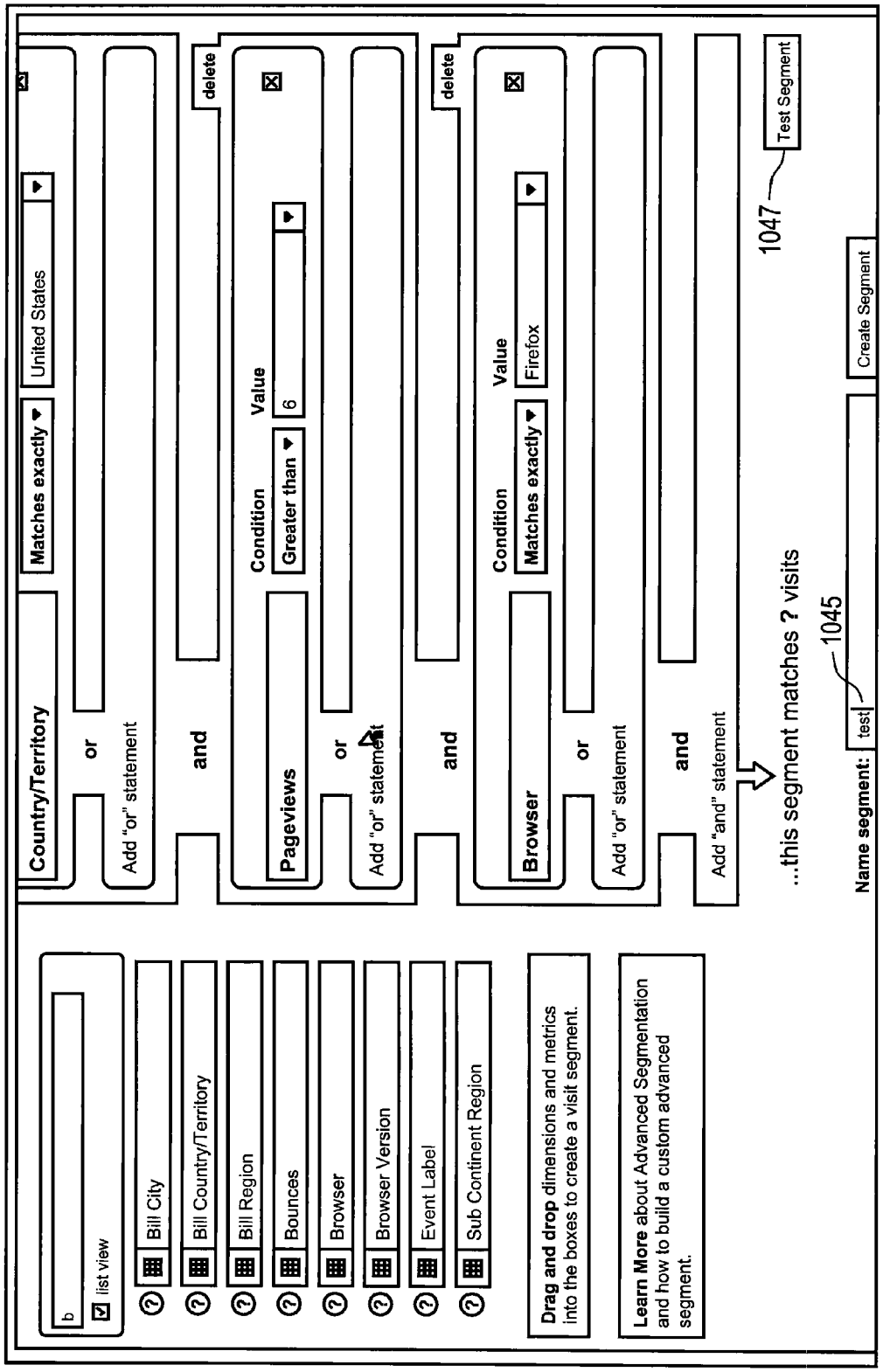
FIG. 10E is a screenshot of a dataset segment scheme that includes three filter definition templates connected by two logic disjunctive operators and a user-provided segment name in accordance with some embodiments.

FIG. 10E is a screenshot of an exemplary dataset segment scheme for a particular web site (e.g., www.googlestore.com) that includes three filter definition templates connected by two logic conjunctive operators and a user-provided segment name in accordance with some embodiments:

["Country/Territory" Matches Exactly "United States"]
  AND
["Pageviews" Greater Than 6]
  AND
["Browser" Matches Exactly "Firefox"]

According to this segment scheme definition, the segment should include those visits made by users from the United States using Firefox with more than six page views. Note that the segment scheme is used for illustrative purpose. Any one skilled in the art can use the graphical user interface to compose a dataset segment scheme at any level of complexity for the web traffic data generated at any web site and managed by the server system 106.

After the entry of the user-provided segment name 1045 and a user selection of the "Test Segment" button 1047, the client device submits a segment scheme testing request to the server system.

Figure 10F:
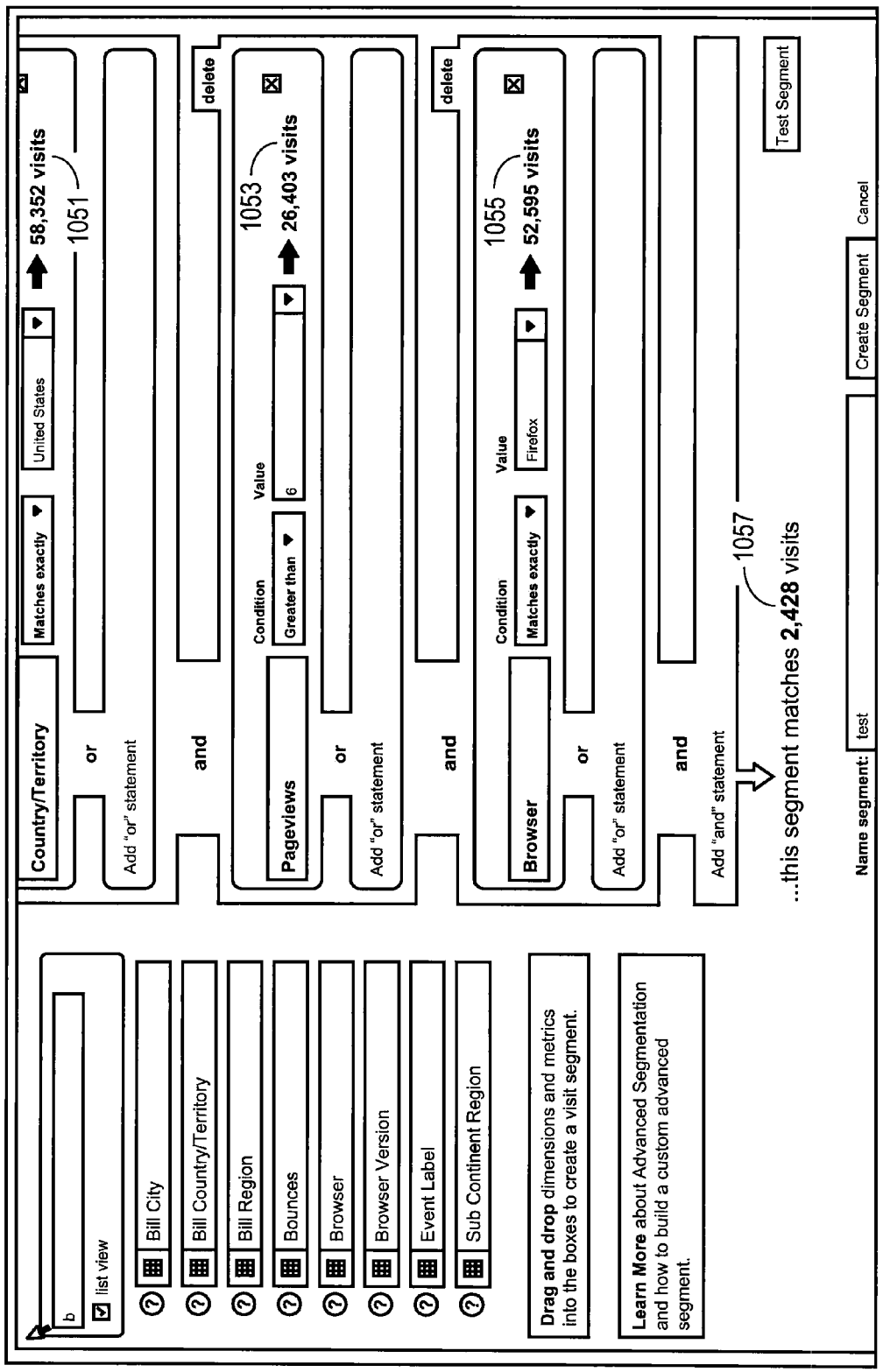
FIG. 10F is a screenshot of the dataset segment scheme in FIG. 10E after a user request to test the dataset segment scheme in accordance with some embodiments.

FIG. 10F is a screenshot of the dataset segment scheme in FIG. 10E after a user request to test the dataset segment scheme in accordance with some embodiments. For each of the three data filters being test, the server system returns a respective visit count 1051, 1053, and 1055. Because the relationships between the three data filters are logic conjunctive, the visit count 1057 of the entire segment is smaller than any of the three data filters' visit counts.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for generating and sharing dataset segment schemes of a multidimensional dataset, wherein the multidimensional dataset is characterized by a set of dimension attributes and a set of metric attributes, comprising:

at a client device having one or more processors and memory storing programs executed by the one or more processors, wherein the client device is connected to a server system through a network:
concurrently displaying a first filter definition template including one or more user-interactive fields and an attribute list including at least one dimension attribute and at least one metric attribute in a web browser window, wherein the first filter definition template and the attribute list are displayed in two separate regions in the web browser window;
receiving a user instruction of selecting a first attribute in the attribute list and associating the first attribute with one of the one or more user-interactive fields to define a first data filter in the first filter definition template;
in response to the user instruction:
replacing the user-interactive field with first and second user-interactive sub-fields;
displaying the first attribute in the first user-interactive sub-field and one or more candidate filter conditions in the second user-interactive sub-field of the first filter definition template;
receiving a user selection of a first filter condition among the one or more candidate filter conditions in the first filter definition template;
in response to the user selection of the first filter condition:
submitting a segment scheme generation request to the server system, wherein the segment scheme generation request includes a first data filter including the first attribute and the first filter criterion;
receiving from the server system a first segment identifier that identifies a dataset segment scheme generated by the server system in response to the segment scheme generation request;
displaying a first segment link at the client device, the first segment link including the first segment identifier, wherein a user selection of the first segment link in association with any one of a plurality of sub-datasets of the multidimensional dataset, each sub-dataset being associated with a respective user, causes a display of a result of processing the sub-dataset in accordance with the dataset segment scheme identified by the first segment identifier;
receiving a request to share the first segment identifier with a second user;
generating a second segment link that includes the first segment identifier; and
sending the second segment link to the second user, wherein a second user selection of the second segment link at a respective client device generates another instance of the first filter definition template including the first data filter and the first filter condition, wherein the another instance of the first filter definition template is used for generating a second dataset segment scheme to be applied to a sub-dataset associated with the second user and the second dataset segment scheme has a second segment identifier different from the first segment identifier.

2. The method of claim 1, further comprising:
in response to a user selection of the first segment link, submitting a first segment request to the server system, the first segment request including the first segment identifier; and
receiving from the server system a first segment result for display to a first user at the client device, wherein the first segment result includes a first data record count of a first set of data records associated with the first user in the dataset that satisfies the first data filter.

3. The method of claim 1, wherein the second segment link is sent to the second user via email.

4. The method of claim 1, wherein a new segment request submitted by the second user is applied to a second set of data records associated with the second user in the dataset at least one of which is different from the first set of data records associated with the first user in the dataset.

5. The method of claim 1, wherein the first filter definition template includes a logic conjunctive link, further comprising:
receiving a user selection of the logic conjunctive link;
displaying a second filter definition template adjacent the first filter definition template;
receiving a user selection of a second attribute in the attribute list to define a second data filter in the second filter definition template;
displaying the second attribute and one or more candidate filter conditions in the second filter definition template;
receiving a user selection of a second filter condition among the one or more candidate filter conditions in the second filter definition template;
submitting a segment scheme test request to the server system, wherein the segment scheme test request includes the first data filter and a second data filter including the second attribute and the second filter condition; and
receiving from the server system a second segment result, wherein the second segment result includes the first data record count, a second data record count of the first set of data records that satisfies the second data filter, and a third data record count of the first set of data records that satisfies both the first data filter and the second data filter.

6. The method of claim 5, further comprising:
displaying the first data record count, the second data record count, and the third data record count simultaneously to the first user at the client device, wherein the first data record count and the second data record count are displayed adjacent the first data filter and the second data filter, respectively.

7. The method of claim 1, wherein the first filter definition template includes a logic disjunctive link, further comprising:
receiving a user selection of the logic disjunctive link;
displaying a second filter definition template adjacent the first filter definition template;
receiving a user selection of a second attribute in the attribute list to define a second data filter in the second filter definition template;
displaying the second attribute and one or more candidate filter conditions in the second filter definition template;
receiving a user selection of a second filter condition among the one or more candidate filter conditions in the second filter definition template;
submitting a segment scheme test request to the server system, wherein the segment scheme test request includes the first data filter and a second data filter including the second attribute and the second filter condition; and
receiving from the server system a second segment result, wherein the second segment result includes the first data record count, a second data record count of the first set of data records that satisfy the second data filter, and a third data record count of the first set of data records that satisfy at least one of the first data filter and the second data filter.

8. A client device for generating and sharing dataset segment schemes of a multidimensional dataset, wherein the client device is connected to a server system through a network, and the multidimensional dataset is characterized by a set of dimension attributes and a set of metric attributes and managed by the server system, comprising:
one or more processors for executing programs; and
memory to store data and to store one or more programs to be executed by the one or more processors, the one or more programs including instructions for:
concurrently displaying a first filter definition template including one or more user-interactive fields and an attribute list including at least one dimension attribute and at least one metric attribute in a web browser window, wherein the first filter definition template and the attribute list are displayed in two separate regions in the web browser window;
receiving a user instruction of selecting a first attribute in the attribute list and associating the first attribute with one of the one or more user-interactive fields to define a first data filter in the first filter definition template;
in response to the user instruction:
replacing the user-interactive field with first and second user-interactive sub-fields;
displaying the first attribute in the first user-interactive sub-field and one or more candidate filter conditions in the second user-interactive sub-field of the first filter definition template;
receiving a user selection of a first filter condition among the one or more candidate filter conditions in the first filter definition template;
in response to the user selection of the first filter condition:
submitting a segment scheme generation request to the server system, wherein the segment scheme generation request includes a first data filter including the first attribute and the first filter criterion;
receiving from the server system a first segment identifier that identifies a dataset segment scheme generated by the server system in response to the segment scheme generation request;
displaying a first segment link at the client device, the first segment link including the first segment identifier, wherein a user selection of the first segment link in association with any one of a plurality of sub-datasets of the multidimensional dataset, each sub-dataset being associated with a respective user, causes a display of a result of processing the sub-dataset in accordance with the dataset segment scheme identified by the first segment identifier;
receiving a request to share the first segment identifier with a second user;
generating a second segment link that includes the first segment identifier; and
sending the second segment link to the second user, wherein a second user selection of the second segment link at a respective client device generates another instance of the first filter definition template including the first data filter and the first filter condition, wherein the another instance of the first filter definition template is used for generating a second dataset segment scheme to be applied to a sub-dataset associated with the second user and the second dataset segment scheme has a second segment identifier different from the first segment identifier.

9. The client device of claim 8, wherein the one or more programs further include instructions for:
in response to a user selection of the first segment link,
submitting a first segment request to the server system, the first segment request including the first segment identifier; and
receiving from the server system a first segment result for display to a first user at the client device, wherein the first segment result includes a first data record count of a first set of data records associated with the first user in the dataset that satisfies the first data filter.

10. The client device of claim 8, wherein the second segment link is sent to the second user via email.

11. The client device of claim 8, wherein a new segment request submitted by the second user is applied to a second set of data records associated with the second user in the dataset at least one of which is different from the first set of data records associated with the first user in the dataset.

12. The client device of claim 8, wherein the first filter definition template includes a logic conjunctive link and the one or more instructions further include instructions for:
receiving a user selection of the logic conjunctive link;
displaying a second filter definition template adjacent the first filter definition template;
receiving a user selection of a second attribute in the attribute list to define a second data filter in the second filter definition template;
displaying the second attribute and one or more candidate filter conditions in the second filter definition template;
receiving a user selection of a second filter condition among the one or more candidate filter conditions in the second filter definition template;
submitting a segment scheme test request to the server system, wherein the segment scheme test request includes the first data filter and a second data filter including the second attribute and the second filter condition; and receiving from the server system a second segment result, wherein the second segment result includes the first data record count, a second data record count of the first set of data records that satisfies the second data filter, and a third data record count of the first set of data records that satisfies both the first data filter and the second data filter.

13. The client device of claim 12, wherein the one or more instructions further include instructions for:

displaying the first data record count, the second data record count, and the third data record count simultaneously to the first user at the client device, wherein the first data record count and the second data record count are displayed adjacent the first data filter and the second data filter, respectively.

14. The client device of claim 8, wherein the first filter definition template includes a logic disjunctive link and the one or more instructions further include instructions for:

receiving a user selection of the logic disjunctive link;
displaying a second filter definition template adjacent the first filter definition template;
receiving a user selection of a second attribute in the attribute list to define a second data filter in the second filter definition template;
displaying the second attribute and one or more candidate filter conditions in the second filter definition template;
receiving a user selection of a second filter condition among the one or more candidate filter conditions in the second filter definition template;
submitting a segment scheme test request to the server system, wherein the segment scheme test request includes the first data filter and a second data filter including the second attribute and the second filter condition; and
receiving from the server system a second segment result, wherein the second segment result includes the first data record count, a second data record count of the first set of data records that satisfy the second data filter, and a third data record count of the first set of data records that satisfy at least one of the first data filter and the second data filter.

15. A non-transitory computer readable-storage medium storing one or more programs for execution by one or more processors of a client device for generating and sharing dataset segment schemes of a multidimensional dataset, wherein the client device is connected to a server system through a network, and the multidimensional dataset is characterized by a set of dimension attributes and a set of metric attributes and managed by the server system, the one or more programs comprising instructions for:

concurrently displaying a first filter definition template including one or more user-interactive fields and an attribute list including at least one dimension attribute and at least one metric attribute in a web browser window, wherein the first filter definition template and the attribute list are displayed in two separate regions in the web browser window;
receiving a user instruction of selecting a first attribute in the attribute list and associating the first attribute with one of the one or more user-interactive fields to define a first data filter in the first filter definition template;
in response to the user instruction:
replacing the user-interactive field with first and second user-interactive sub-fields;
displaying the first attribute in the first user-interactive sub-field and one or more candidate filter conditions in the second user-interactive sub-field of the first filter definition template;
receiving a user selection of a first filter condition among the one or more candidate filter conditions in the first filter definition template;
in response to the user selection of the first filter condition:
submitting a segment scheme generation request to the server system, wherein the segment scheme generation request includes a first data filter including the first attribute and the first filter criterion;
receiving from the server system a first segment identifier that identifies a dataset segment scheme generated by the server system in response to the segment scheme generation request;
displaying a first segment link at the client device, the first segment link including the first segment identifier, wherein a user selection of the first segment link in association with any one of a plurality of sub-datasets of the multidimensional dataset, each sub-dataset being associated with a respective user, causes a display of a result of processing the sub-dataset in accordance with the dataset segment scheme identified by the first segment identifier;
receiving a request to share the first segment identifier with a second user;
generating a second segment link that includes the first segment identifier; and
sending the second segment link to the second user, wherein a second user selection of the second segment link at a respective client device generates another instance of the first filter definition template including the first data filter and the first filter condition, wherein the another instance of the first filter definition template is used for generating a second dataset segment scheme to be applied to a sub-dataset associated with the second user and the second dataset segment scheme has a second segment identifier different from the first segment identifier.

16. The non-transitory computer readable-storage medium of claim 15, wherein the one or more programs further include instructions for:

in response to a user selection of the first segment link,
submitting a first segment request to the server system, the first segment request including the first segment identifier; and
receiving from the server system a first segment result for display to a first user at the client device, wherein the first segment result includes a first data record count of a first set of data records associated with the first user in the dataset that satisfies the first data filter.

17. The non-transitory computer readable-storage medium of claim 15, wherein the second segment link is sent to the second user via email.

18. The non-transitory computer readable-storage medium of claim 15, wherein a new segment request submitted by the second user is applied to a second set of data records associated with the second user in the dataset at least one of which is different from the first set of data records associated with the first user in the dataset.

19. The non-transitory computer readable-storage medium of claim 15, wherein the first filter definition template includes a logic conjunctive link and the one or more programs further include instructions for:

receiving a user selection of the logic conjunctive link;

displaying a second filter definition template adjacent the first filter definition template;

receiving a user selection of a second attribute in the attribute list to define a second data filter in the second filter definition template;

displaying the second attribute and one or more candidate filter conditions in the second filter definition template;

receiving a user selection of a second filter condition among the one or more candidate filter conditions in the second filter definition template;

submitting a segment scheme test request to the server system, wherein the segment scheme test request includes the first data filter and a second data filter including the second attribute and the second filter condition; and receiving from the server system a second segment result, wherein the second segment result includes the first data record count, a second data record count of the first set of data records that satisfies the second data filter, and a third data record count of the first set of data records that satisfies both the first data filter and the second data filter.

20. The non-transitory computer readable-storage medium of claim 19, wherein the one or more programs further include instructions for:

displaying the first data record count, the second data record count, and the third data record count simultaneously to the first user at the client device, wherein the first data record count and the second data record count are displayed adjacent the first data filter and the second data filter, respectively.

21. The non-transitory computer readable-storage medium of claim 15, wherein the first filter definition template includes a logic disjunctive link and the one or more programs further include instructions for:

receiving a user selection of the logic disjunctive link;

displaying a second filter definition template adjacent the first filter definition template;

receiving a user selection of a second attribute in the attribute list to define a second data filter in the second filter definition template;

displaying the second attribute and one or more candidate filter conditions in the second filter definition template;

receiving a user selection of a second filter condition among the one or more candidate filter conditions in the second filter definition template;

submitting a segment scheme test request to the server system, wherein the segment scheme test request includes the first data filter and a second data filter including the second attribute and the second filter condition; and receiving from the server system a second segment result, wherein the second segment result includes the first data record count, a second data record count of the first set of data records that satisfy the second data filter, and a third data record count of the first set of data records that satisfy at least one of the first data filter and the second data filter.

* * * * *